US012737825B2

(12) United States Patent
Sood et al.

(10) Patent No.: US 12,737,825 B2
(45) Date of Patent: Sep. 15, 2026

(54) PREDICTIVE SEED SCRIPTING FOR SOYBEANS

(71) Applicant: CLIMATE LLC, Saint Louis, MO (US)

(72) Inventors: Shilpa Sood, Chesterfield, MO (US); Jigyasa Bhagat, San Francisco, CA (US); David Rock, San Francisco, CA (US); Allan Trapp, San Francisco, CA (US); Nicholas Helland, San Francisco, CA (US); Morrison Jacobs, San Francisco, CA (US); Susan Andrea MacIsaac, Jersey Ciy, NJ (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 0 days.

(21) Appl. No.: 16/723,728

(22) Filed: Dec. 20, 2019

(65) Prior Publication Data

US 2020/0202458 A1 Jun. 25, 2020

Related U.S. Application Data

(60) Provisional application No. 62/784,625, filed on Dec. 24, 2018.

(51) Int. Cl.
*G06Q 50/02* (2024.01)
*G06Q 10/0631* (2023.01)
(Continued)

(52) U.S. Cl.
CPC ....... *G06Q 50/02* (2013.01); *G06Q 10/06315* (2013.01); *G06Q 10/06393* (2013.01); *G06V 20/188* (2022.01)

(58) Field of Classification Search
None
See application file for complete search history.

(56) References Cited

U.S. PATENT DOCUMENTS

2014/0277959 A1* 9/2014 Wagers ................ A01C 21/005 701/50
2016/0278277 A1 9/2016 Vålberg
(Continued)

FOREIGN PATENT DOCUMENTS

CN 205373764 7/2016
CN 107077650 8/2017
(Continued)

OTHER PUBLICATIONS

The International Searching Authority, "Search Report", in application No. PCT/US2019/068064, dated Mar. 25, 2020, 12 pages.
(Continued)

*Primary Examiner* — Jerry O'Connor
*Assistant Examiner* — Matthew H Divelbiss
(74) *Attorney, Agent, or Firm* — Harness, Dickey & Pierce, P.L.C.

(57) ABSTRACT

A method and apparatus for adjusting seeding rates at a sub-field level is provided. The method comprises identifying a set of target agricultural fields having intra-field crop variability above a threshold based upon historical agricultural data; determining vegetative index values for geo-locations within each field using subsets of digital images, wherein each subset corresponds to a specific target field; for each target field, determining a plurality of sub-field zones based upon vegetative index values for geo-locations within each target field, wherein each sub-field zone contains similar vegetative index values; determining vegetative index productivity scores for each sub-field zone that represent a relative crop productivity specific to a type of seed planted within corresponding sub field zones; determining adjusted seeding rates for each of the sub-field zones by adjusting current seeding rates using the vegetative index
(Continued)

productivity scores corresponding to each of the sub-field zones.

20 Claims, 15 Drawing Sheets

(51) Int. Cl.
*G06Q 10/0639* (2023.01)
*G06V 20/10* (2022.01)

(56) References Cited

U.S. PATENT DOCUMENTS

2016/0302351 A1* 10/2016 Schildroth .............. H04L 67/12
2017/0090068 A1* 3/2017 Xiang .................... G06Q 10/04
2017/0196171 A1 7/2017 Xu et al.
2017/0351963 A1* 12/2017 Leeds ..................... G01S 7/003
2018/0132423 A1 5/2018 Rowan et al.
2019/0050948 A1* 2/2019 Perry ..................... G06Q 50/02
2020/0005166 A1* 1/2020 Reich ....................... G06N 5/04

FOREIGN PATENT DOCUMENTS

CN 107733321 2/2018
JP 2003047340 2/2003
WO WO2018/093931 3/2017

OTHER PUBLICATIONS

Current Claims in application No. PCT/US2019/068064, dated Mar. 2020, 8 pages.

* cited by examiner

Fig. 1

Fig. 2
(a)
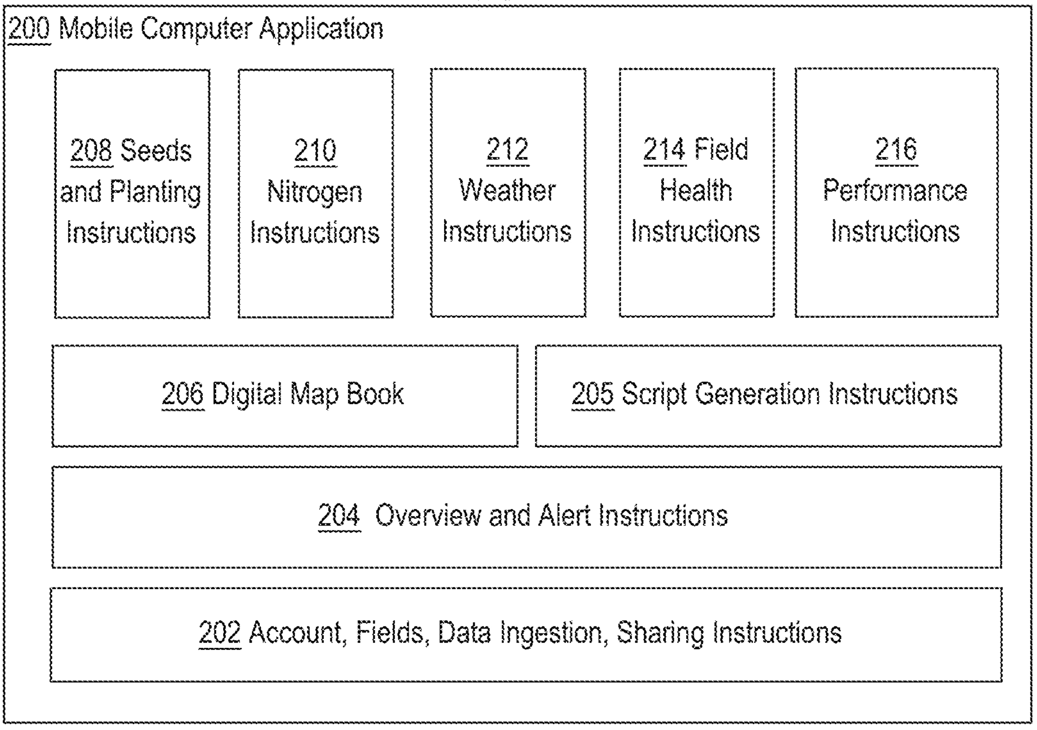
(b)
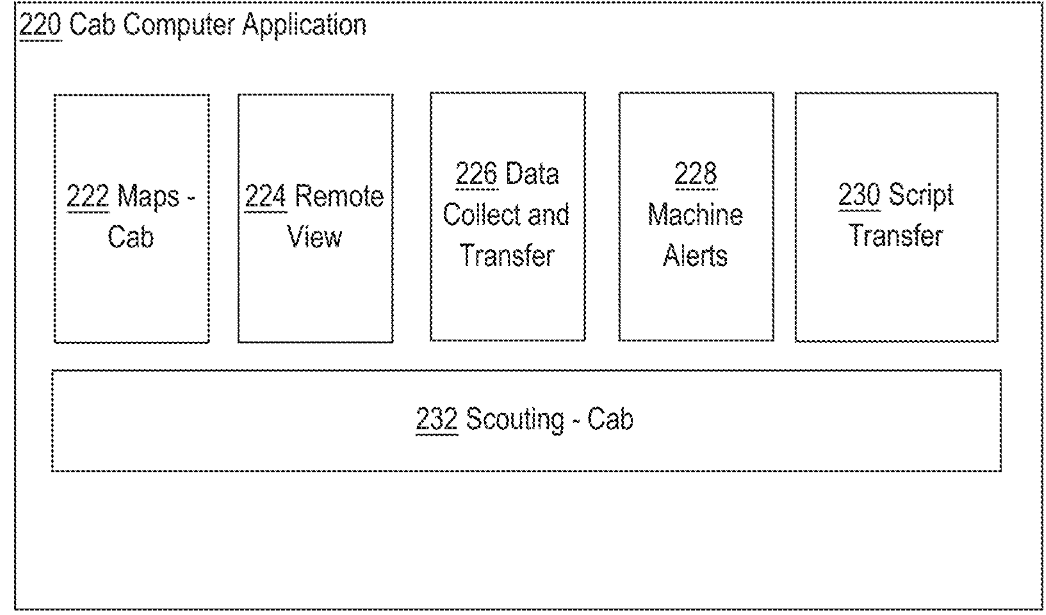

Agronomic Data Preprocessing
305
Agronomic Data Subset Selection
310
Feedback Loop
Agronomic Dataset Evaluation
315
Agronomic Model Creation
320
Storing Agronomic Model
325

SERVER
430
INTERNET
428
ISP
426
LOCAL
NETWORK
422
HOST
424
NETWORK
LINK
420
400
STORAGE
DEVICE
410
ROM
408
MAIN
MEMORY
406
BUS
402
COMMUNICATION
INTERFACE
418
PROCESSOR
404
DISPLAY
412
INPUT DEVICE
414
CURSOR
CONTROL
416

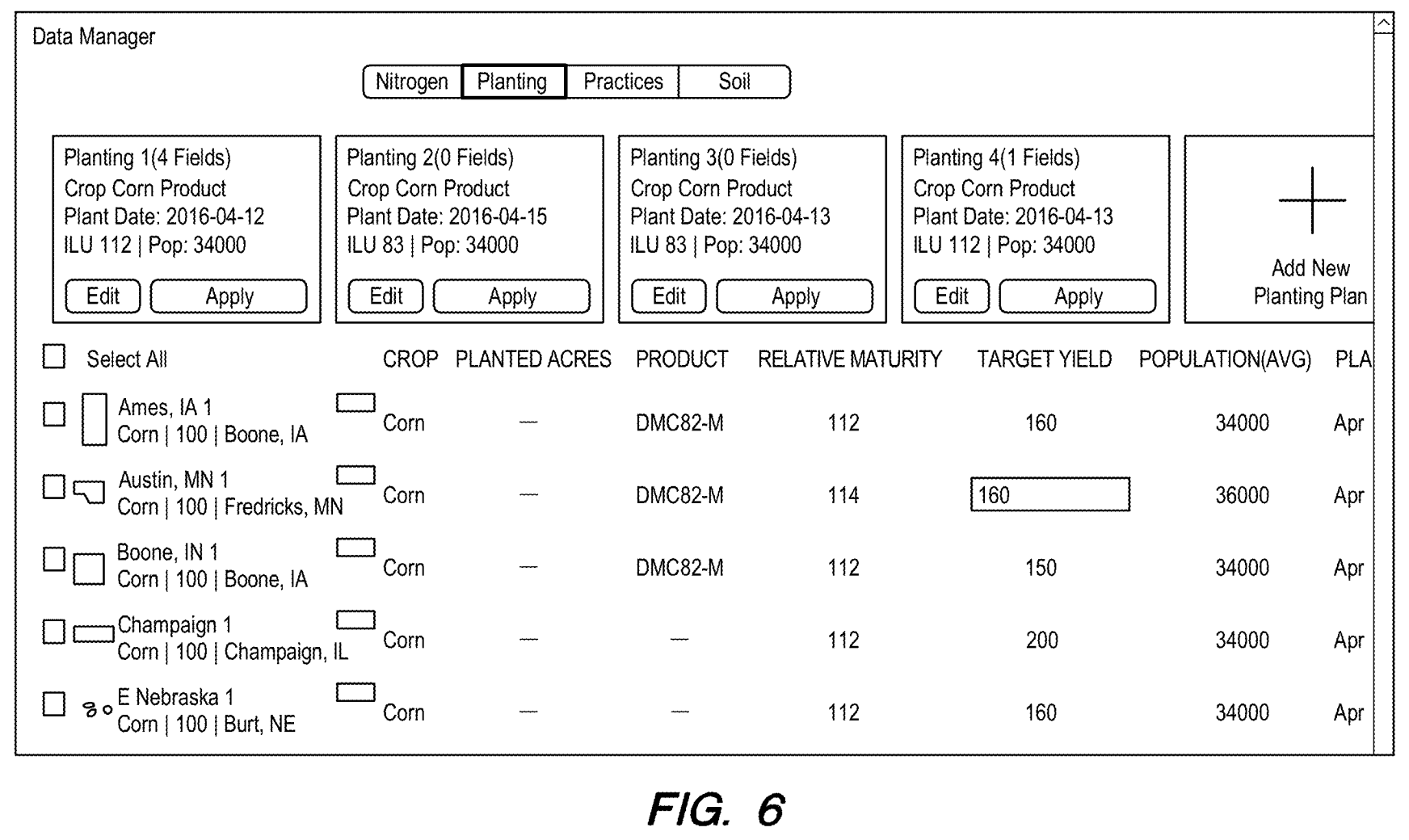

Data Manager

Nitrogen | Planting | Practices | Soil

Planting 1(4 Fields)
Crop Corn Product
Plant Date: 2016-04-12
ILU 112 | Pop: 34000
Edit Apply Planting 2(0 Fields)
Crop Corn Product
Plant Date: 2016-04-15
ILU 83 | Pop: 34000
Edit Apply Planting 3(0 Fields)
Crop Corn Product
Plant Date: 2016-04-13
ILU 83 | Pop: 34000
Edit Apply Planting 4(1 Fields)
Crop Corn Product
Plant Date: 2016-04-13
ILU 112 | Pop: 34000
Edit Apply Add New
Planting Plan

| Select All | CROP | PLANTED ACRES | PRODUCT | RELATIVE MATURITY | TARGET YIELD | POPULATION(AVG) | PLA |
|---|---|---|---|---|---|---|---|
| Ames, IA 1 Corn \| 100 \| Boone, IA | Corn | — | DMC82-M | 112 | 160 | 34000 | Apr |
| Austin, MN 1 Corn \| 100 \| Fredricks, MN | Corn | — | DMC82-M | 114 | 160 | 36000 | Apr |
| Boone, IN 1 Corn \| 100 \| Boone, IA | Corn | — | DMC82-M | 112 | 150 | 34000 | Apr |
| Champaign 1 Corn \| 100 \| Champaign, IL | Corn | — | — | 112 | 200 | 34000 | Apr |
| E Nebraska 1 Corn \| 100 \| Burt, NE | Corn | — | — | 112 | 160 | 34000 | Apr |

FIG. 6

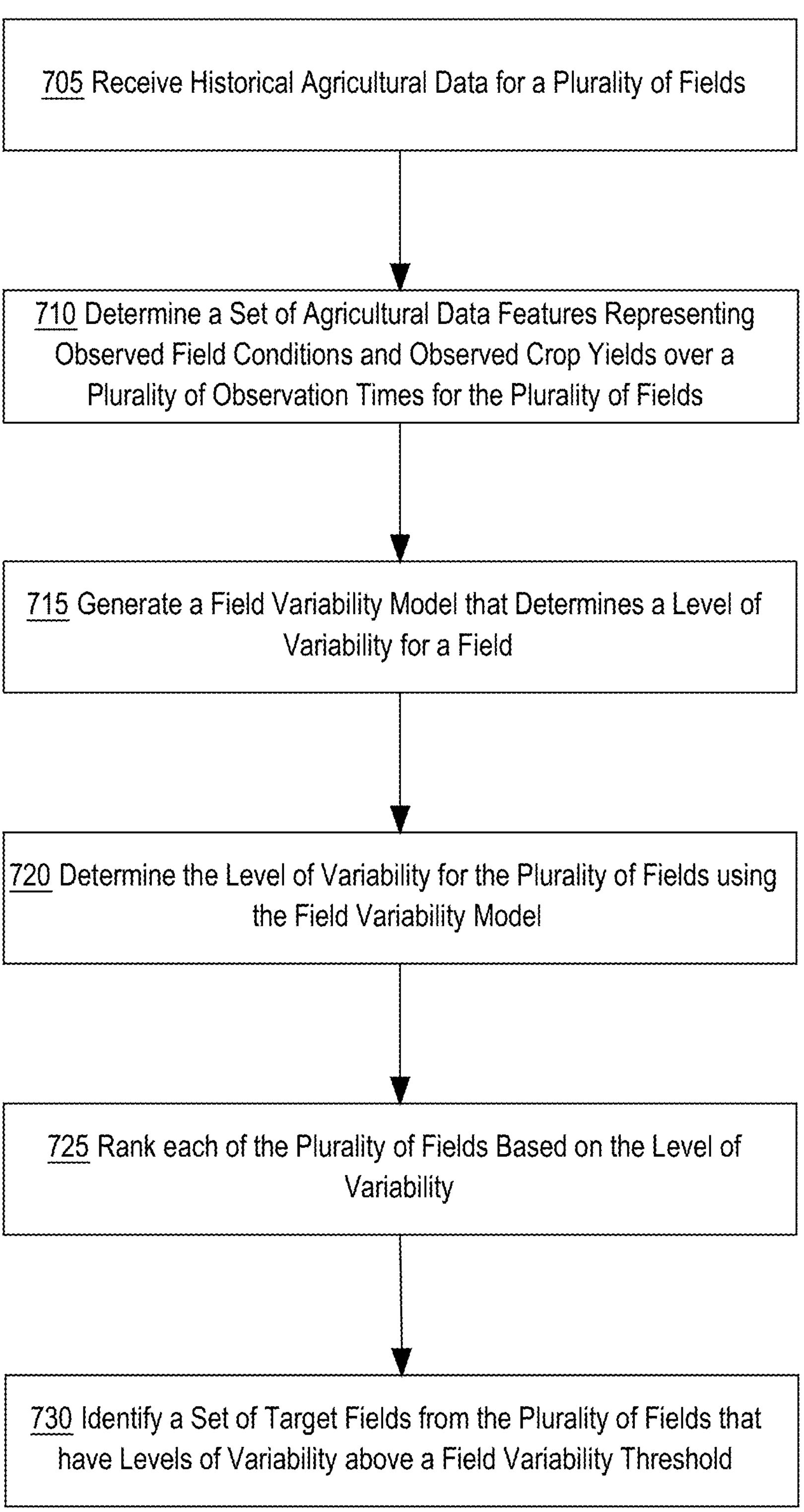
FIG. 7
705 Receive Historical Agricultural Data for a Plurality of Fields
710 Determine a Set of Agricultural Data Features Representing Observed Field Conditions and Observed Crop Yields over a Plurality of Observation Times for the Plurality of Fields
715 Generate a Field Variability Model that Determines a Level of Variability for a Field
720 Determine the Level of Variability for the Plurality of Fields using the Field Variability Model
725 Rank each of the Plurality of Fields Based on the Level of Variability
730 Identify a Set of Target Fields from the Plurality of Fields that have Levels of Variability above a Field Variability Threshold FIG. 14
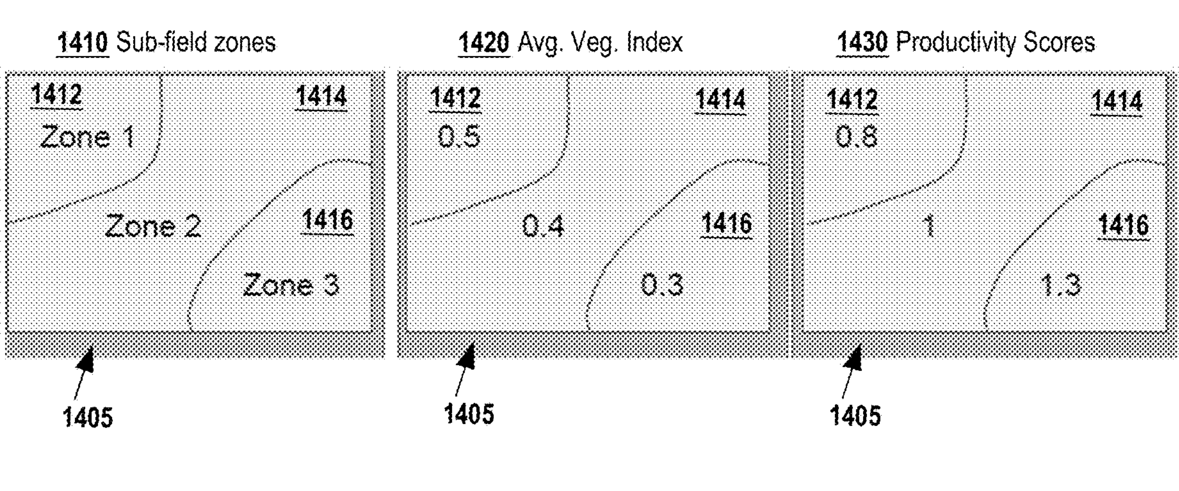
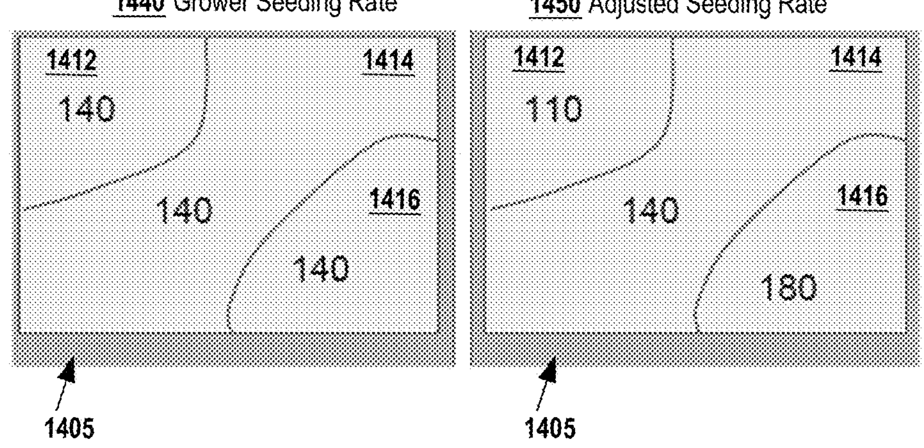

PREDICTIVE SEED SCRIPTING FOR SOYBEANS

BENEFIT CLAIM

This application claims the benefit of priority under 35 U.S.C. § 119 from provisional application 62/784,625, filed Dec. 24, 2018, the entire contents of which is hereby incorporated by reference as if fully set forth herein. The applicants hereby rescind any disclaimer of claim scope in the priority applications or the prosecution history thereof and advise the USPTO that the claims in this application may be broader than any claim in the priority applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2018 The Climate Corporation.

FIELD OF THE DISCLOSURE

One technical field of the present disclosure is computer-implemented agricultural data management. Another technical field is computer systems programmed for selecting target fields with intra-field crop variability and prescribing adjusted seeding rates to sub-fields within the target fields. Another technical field is automated seeding of agricultural fields.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many factors may affect yields of growers' fields. Conventionally, certain types of agricultural data are used in predicting yields for fields. These types of agricultural data generally do not include measuring variations of observations over different geo-locations within a field. Thus, predicting yields for fields that have yield variations within a field may be difficult. It may be helpful to consider additional types of agricultural observations that describe provide yield prediction at a granular subfield level.

Given the potentially large number of fields and subfields and the general cost of installing and maintaining soil probes at a subfield level, it would be helpful to eliminate the need to probe soil in every field or every subfield. To achieve this goal, it would be helpful to estimate crop productivity at a subfield level. Furthermore, seeding rate has a material effect on yield. Varying seeding rates on a subfield level may be helpful in improving the overall yield of a field. In order to vary seeding rate at a subfield level, growers must understand which subfields, within a field, perform better or worse than other subfields. Understanding yield performance at a subfield level may allow growers to accurately vary their seeding rates in order to optimize subfield yields based upon crop productivity.

SUMMARY

The appended claims may serve as a summary of the disclosure.

BRIEF DESCRIPTION OF THE DRAWINGS

In the drawings:

FIG. 1 illustrates an example computer system that is configured to perform the functions described herein, shown in a field environment with other apparatus with which the system may interoperate.

FIG. 2 illustrates two views of an example logical organization of sets of instructions in main memory when an example mobile application is loaded for execution.

FIG. 6 depicts an example embodiment of a spreadsheet view for data entry.

FIG. 7 illustrates a programmed process of generating a field variability model using a set of agricultural features and determining a set of target fields that have a desired level of intra-field crop yield variability.

FIG. 14 illustrates an example embodiment of determining sub-field zones within fields and determining a vegetative productivity score for each of the sub-field zones.

DETAILED DESCRIPTION

Figure 3:
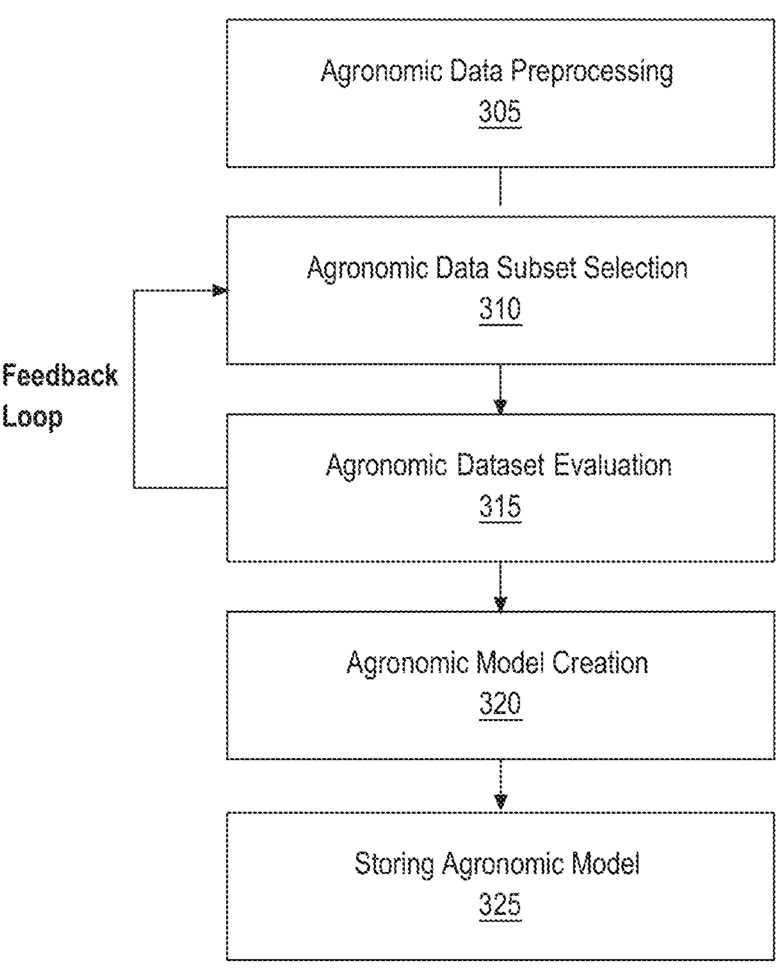
FIG. 3 illustrates a programmed process by which the agricultural intelligence computer system generates one or more preconfigured agronomic models using agronomic data provided by one or more data sources.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
2.1. STRUCTURAL OVERVIEW
2.2. APPLICATION PROGRAM OVERVIEW
2.3. DATA INGEST TO THE COMPUTER SYSTEM
2.4. PROCESS OVERVIEW—AGRONOMIC MODEL TRAINING
2.5. TARGET AGRICULTURAL FIELD IDENTIFICATION SUBSYSTEM
2.6. SEEDING RATE ADJUSTMENT SUBSYSTEM
2.7. IMPLEMENTATION EXAMPLE—HARDWARE OVERVIEW
3. FUNCTIONAL OVERVIEW—DETERMINE TARGET FIELDS
3.1. COLLECTING AGRICULTURAL DATA AND YIELD DATA
3.2. SELECTING AGRICULTURAL DATA FEATURES
3.3. BUILDING FIELD VARIABILITY MODEL
3.4. DETERMINING FIELD VARIABILITY LEVELS FOR FIELDS
3.5. IDENTIFYING A SET OF TARGET FIELDS
4. FUNCTIONAL OVERVIEW—DETERMINE ADJUSTED SEEDING RATES
4.1. COLLECTING DIGITAL IMAGES OF TARGET FIELDS
4.2. DETERMINING VEGETATIVE INDEX VALUES
4.3. DETERMINING SUB-FIELD ZONES WITHIN FIELDS
4.4. DETERMINING VEGETATIVE PRODUCTIVITY SCORES FOR SUB-FIELD ZONES
4.5. GENERATING SEEDING RATE PRESCRIPTIONS
4.6 APPLYING SEEDING RATE PRESCRIPTIONS
5. EXTENSIONS AND ALTERNATIVES

1. General Overview

A computer system and computer-implemented method are disclosed herein for recommending adjusted intra-field seeding rates for one or more target fields. In an embodiment, a set of target agricultural fields with intra-field crop variability may be identified based upon historical agricultural data. The historical agricultural data may include historical yield data and historical observed agricultural data for a plurality of agricultural fields. The server computer system may receive, over a digital data communication network, a plurality of digital images of the set of target fields. The server computer may determine vegetative index values for geo-locations within each field of the set of target agricultural fields using subsets of the plurality of digital images, where each subset among the subsets of the plurality of pixel images corresponds to a specific target agricultural field in the set of target agricultural fields.

For each target agricultural field, the server computer may determine a plurality of subfield zones using the vegetative index values for geo-locations within each target agricultural field. Geo-locations within each subfield zone may have similar vegetative index values. The server computer may determine vegetative index productivity scores for each subfield zone of each target agricultural field. The vegetative index productivity scores may represent relative crop productivity for a specific type of seed planted within corresponding subfield zones.

The server computer may receive, over a digital data communication network, current seeding rates for each of the subfield zones of the set of target agricultural fields. The server computer system may determine adjusted seeding rates for each of the subfield zones of the set of target agricultural fields by adjusting the current seeding rates using the vegetative index productivity scores. The server computer system may send the adjusted seeding rates for each of the subfield zones to a field manager computer device.

In an embodiment, the server computer system may operate a planter according to one or more of the adjusted seeding rates to plant seed in one or more of the subfield zones of one or more target agricultural fields. Specifically, the server computer system may generate one or more one or more scripts that contain instructions specifying adjusting seeding rates for each of the one or more subfield zones on the one or more target fields. The one or more scripts may represent programmed planting instructions for an automated planter that specify operating parameters, such as specific seeding rates for specific geo-locations represented by the one or more subfield zones.

2. Example Agricultural Intelligence Computer System

2.1 Structural Overview

Figure 1:
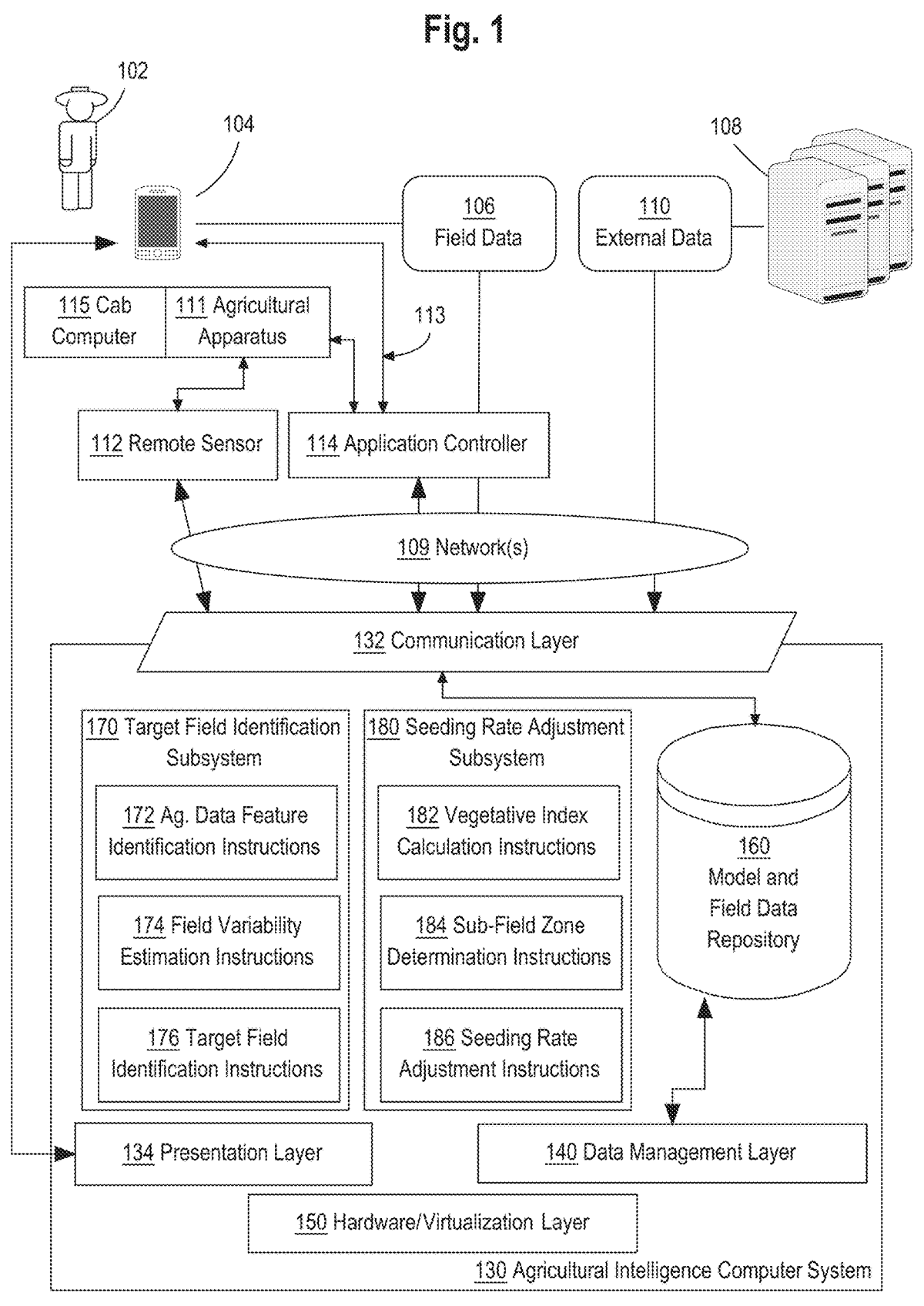

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
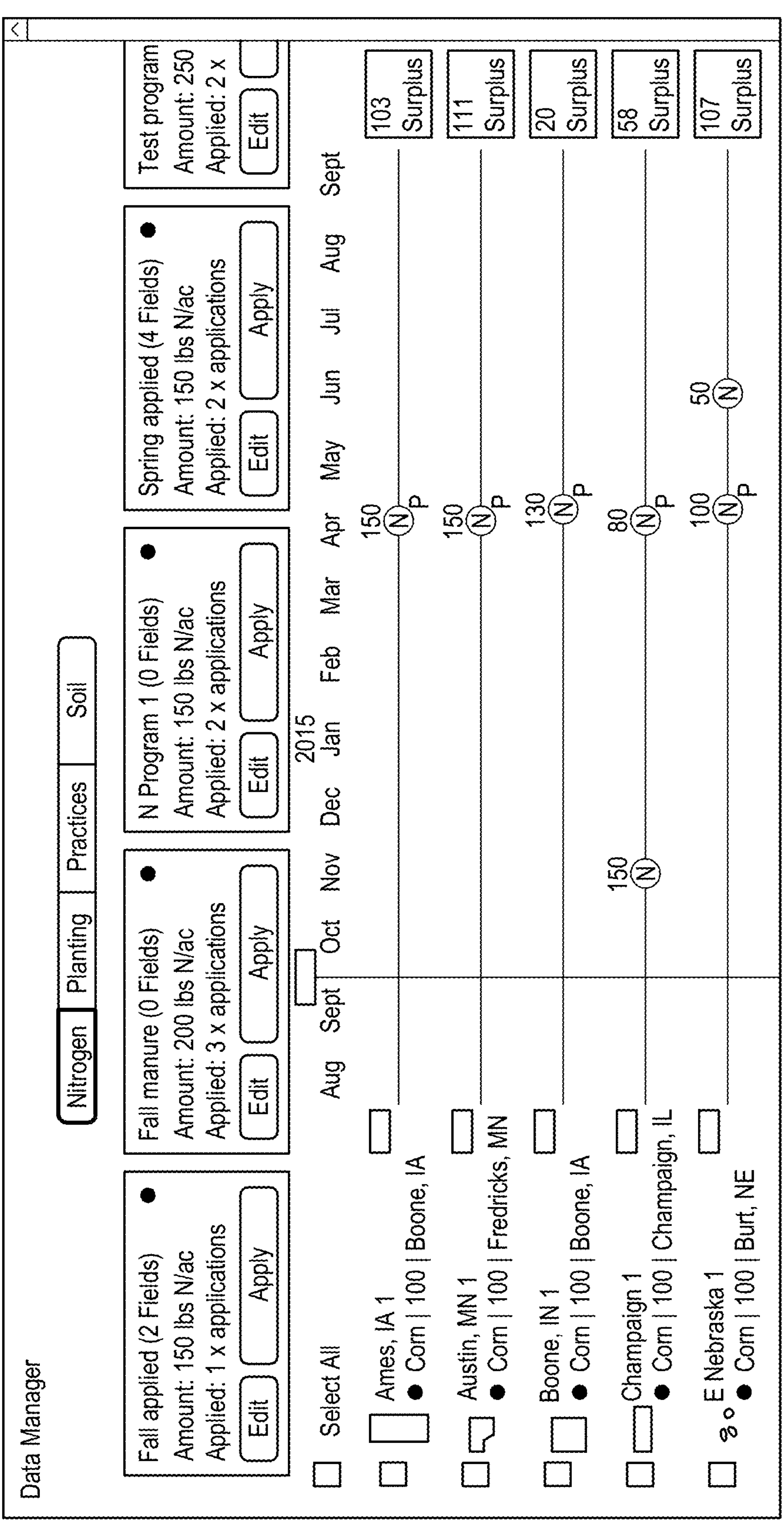
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of target field identification subsystem 170 and seeding rate adjustment subsystem 180 comprise a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the agricultural data feature identification instructions 172 may comprise a set of pages in RAM that contain instructions which when executed cause performing the location selection functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component of a target field identification subsystem 170 and a seeding rate adjustment subsystem 180 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into byte-code or the equivalent, for execution by the agricultural intelligence computer system 130.

Figure 4:
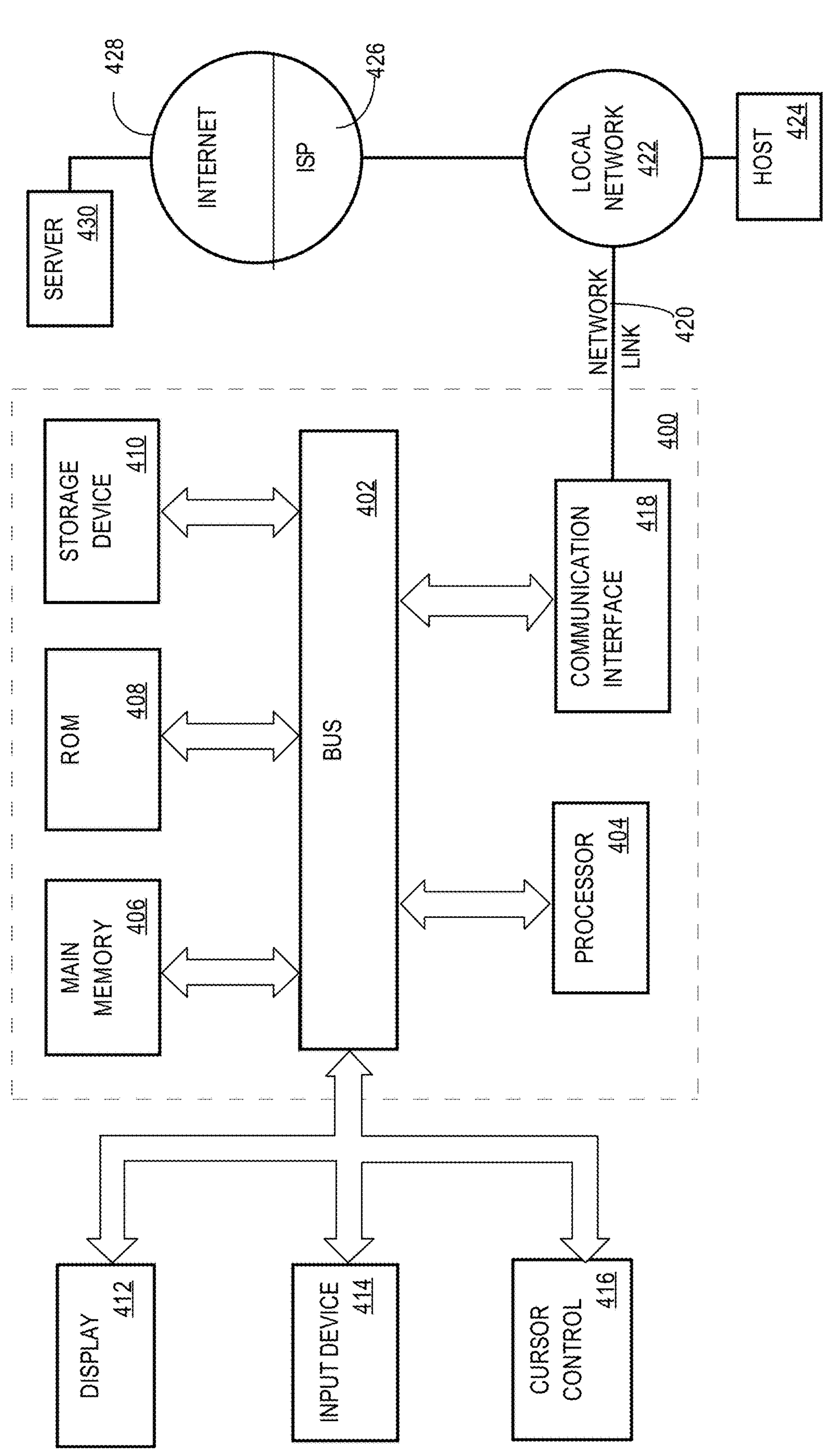
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches;

hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Target Agricultural Field Identification Subsystem

In an embodiment, the agricultural intelligence computer system 130, among other components, includes target field identification subsystem 170. The target field identification subsystem 170 is programmed or configured to identify a set of target agricultural fields from a plurality of agricultural fields that have an optimal level of intra-field crop yield variability. As used herein the term "optimal" and related terms (e.g., "optimizing", "optimization", etc.) are broad terms that refer to the "best or most effective" with respect to any outcome, system, data etc. ("universal optimization") as well as improvements that are "better or more effective ("relative optimization"). The set of target agricultural fields may be a subset of the plurality of fields that represent agricultural fields that have a level of intra-field crop yield variability that is above a desired threshold.

In an embodiment, identifying the set of target agricultural fields is based upon input received by the agricultural intelligence computer system 130 including, but not limited to, historical crop yield data records for the plurality of agricultural fields and historical observed agricultural data for the plurality of agricultural fields. For example, the historical observed agricultural data may include observed mean monthly temperatures, field slope conditions, observed monthly precipitation, observed organic matter, crop yield ranges, observed historical crop yield, and historical seeding rates. In an embodiment, the agricultural intelligence computer system 130 may receive historical agricultural data from various sources including, but not limited to, publicly available agricultural databases, observations collected by growers of the plurality of fields, and any other public or private source.

In an embodiment, the target field identification subsystem 170 may comprise or be programmed with agricultural data feature identification instructions 172, field variability estimation instructions 174, and target field identification instructions 176. The agricultural data feature identification instructions 172 provide instructions to determine a set of agricultural data features to be used to evaluate intra-field crop yield variability for the plurality of agricultural fields. The set of agricultural data features may represent a selected subset of observed field conditions and observed crop yields of a plurality of observation times. The field variability estimation instructions 174 provide instructions to generate a field variability model that determines a level of intra-field crop yield variability for each field of the plurality of agricultural fields using the set of agricultural data features. The field variability model may be configured to receive as input agricultural data for a specific agricultural field and produce an output field variability score. The target field identification instructions 176 may be configured to rank each agricultural field of the plurality of agricultural fields and identify the set of target fields that have level of intra-field crop yield variability that is above a specified variability threshold. For example, each of the agricultural fields may be ranked based upon crop yield variability and the top 20% of fields with the highest crop yield variability may be identified as the set of target agricultural fields.

2.6. Seeding Rate Adjustment Subsystem

In an embodiment, the agricultural intelligence computer system 130, among other components, includes seeding rate adjustment subsystem 180. The seeding rate adjustment subsystem 180 is programmed or configured to identify seeding rates for sub-field zones within target agricultural fields and recommend adjusted seeding rates in order to optimize crop yield within sub-field zones. Sub-field zones may refer to sub-areas within an agricultural field. Each sub-field zone may have planted crop that has been identified as having a similar crop yield output.

In an embodiment, the seeding rate adjustment subsystem 180 may comprise vegetative index calculation instructions 182, sub-field zone determination instructions 184, seeding rate adjustment instructions 186. The vegetative index calculation instructions 182 provide instructions to determine vegetative index values for geo-locations within each target field of the set of target fields using a subset of digital images of the target fields. The subset of digital images may correspond to a specific target field of the set of target fields. For example, the subset of digital images may refer to field imagery data, such as satellite images, captured at various points in time over one or more years. The digital images may provide, through digital signal analysis, plant growth estimations that may be used to determine plant maturity and crop yield estimations.

The sub-field zone determination instructions 184 may provide instructions to determine a plurality of sub-field zones within a target field using the vegetative index values for geo-locations within the target field. Each sub-field zone may include identified geo-locations that have similar vegetative index values. The geo-locations with similar vegetative index values may be grouped together to form a sub-field zone. For example, the digital images for a target field may indicate a group of geo-locations within a close proximity that have vegetative index values that are either identical or similar. The group of geo-locations may then be grouped together to form a sub-field zone. The sub-field zone determination instructions 184 may calculate vegetative productivity scores for each sub-field zone based upon the vegetative index values and the specific seed planted within each sub-field zone. For example, the sub-field zone determination instructions 184 may analyze seed properties of seeds to be planted and calculate vegetative index productivity scores based upon the vegetative index score and the seed properties of the seed to be planted.

The seeding rate adjustment instructions 186 may provide instructions to adjust seeding rates of seeds to be planted on sub-field zones based upon currently prescribed seeding rates for sub-field zones and calculated vegetative index productivity scores. For example, if the vegetative index productivity score for a particular sub-field zone indicates that the sub-field zone has a higher potential crop yield productivity, then the currently prescribed seeding rate may be adjusted to optimize crop yield using an adjusted seeding rate for future planting strategies.

2.7. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Overview—Determine Target Fields

FIG. 7 illustrates an example embodiment of generating a field variability model using a set of agricultural features and determining a set of target fields that have a desired level of intra-field crop yield variability. FIG. 7 may be programmed in program instructions as part of the instruction sets that have been previously described in sections 2.5, 2.6.

3.1. Collecting Agricultural Data and Yield Data

At block 705, computer system 130 is programmed to receive historical agricultural data for a plurality of fields. In an embodiment, historical agricultural data received by system 130 may include agricultural data and crop yield data collected for a set of fields for the purpose of building and training the field variability model. Data sources may include publicly available agricultural data observations, agricultural data provided by research partners who collect data from several different grower fields, and independent growers. The data may be received via manual entry by the user 102, such as a grower. The data may also be part of the field data 106 or the external data 110. In addition, the data may also be retrieved from the repository 160 if they have been previously collected for purposes of other applications.

In some embodiments, fields may be divided into subfields. For example, each subfield can be 10 meters by 10 meters. The server 130 may be programmed to receive or obtain different types of data regarding different subfields within specific fields at different points within a period for model training purposes. The different types of data may include soil chemistry data, such as data related to organic matter, cation exchange capacity, or pH scale. The different types of data may include soil topography data, such as elevation, slope, curvature, or aspect. The different types of data may further include imagery data, such as satellite images or other aerial images, which can indicate moisture, vegetation, disease state, or other soil properties of the specific fields and thus can be used to derive other types of data. The period can be one or more years. The frequency of the different points may be hourly, daily, monthly, quarterly, or even less frequently for those types of data that do not vary much over time.

In an embodiment, server 130 may be programmed to receive weather-related data regarding the different subfields at various points within the period. The frequency of the various points in this case may be higher than the frequency of the different points at which the other types of data is available. The weather data could include precipitation data and irrigation data for water into the soil or evapotranspiration data, drainage data, runoff data, or initial or minimum soil saturation data for water out of the soil. Weather data may be obtained, for example, as part of external data 110 from a third-party online weather information database or server, via a parameterized URL, API call or other programmatic mechanism.

In an embodiment, server 130 may be programmed to receive soil density data, such as seeding rates, and yield data regarding the different subfields at the different points within the period.

3.2. Selecting Agricultural Data Features

At block 710, the agricultural data feature identification instructions 172 determines a set of agricultural data features that represent observed field conditions and observed crop yields over a plurality of observation times for the plurality of fields. In an embodiment, the agricultural data for the set of fields may be used to determine a set of agricultural data features for generating and training the field variability model. The agricultural data features may be identified by categorizing agricultural data into different types of observations and then selecting specific features based upon the categorization. The agricultural data may include a plurality of different types of observations that may be categorized based upon observation type. For example, observations types may be categorized into crop yield type observations, soil makeup type observations, temperature type observations, precipitation type observations, and planting type observations. Each categorized observation type may be further categorized into subtypes based upon the different types of observations. For example, crop yield type observations may include a mean crop yield for a field, an interquartile range of crop yield for a field, and observed seeding rate for a field.

The soil makeup type category may include agricultural data features received from the observed set of fields and/or from the Soil Survey Geographic Database (SSURGO). The soil makeup data features may include composition, pH, organic matter (OM), and cation exchange capacity (CEC). The observed temperature type category may include normalized mean temperature values for specific months from different fields across different observed growth years. For example, mean minimum and mean maximum temperatures for specific growth months may be identified, such as the mean minimum temperature for May, June, July, September, and any other desired month may be determined and used as an agricultural data feature. The observed precipitation type category may include normalized cumulative precipitation values for specific months as well as standard deviations of normalized observed precipitation values for specific months.

Each of the agricultural observation types may be evaluated to determine an optimal set of agricultural data features to be used for training the field variability model. In an embodiment, a random forest algorithm may be implemented as the machine learning technique to determine and rank different agricultural features based upon their mean decrease Gini. Random forest algorithm is an ensemble machine learning method that operates by constructing multiple decision trees during a training period and then outputs the class that is the mean regression of the individual trees. The mean decrease Gini coefficient is a measure of how each variable contributes to the homogeneity of the nodes and leaves in the resulting random forest. In an embodiment, recursive feature selection may be implemented to eliminate agricultural features after each round based upon their relative importance to determining field variability. In other embodiments, other commercially available machine learning techniques may be used to determine the set of agricultural data features.

Figure 8:
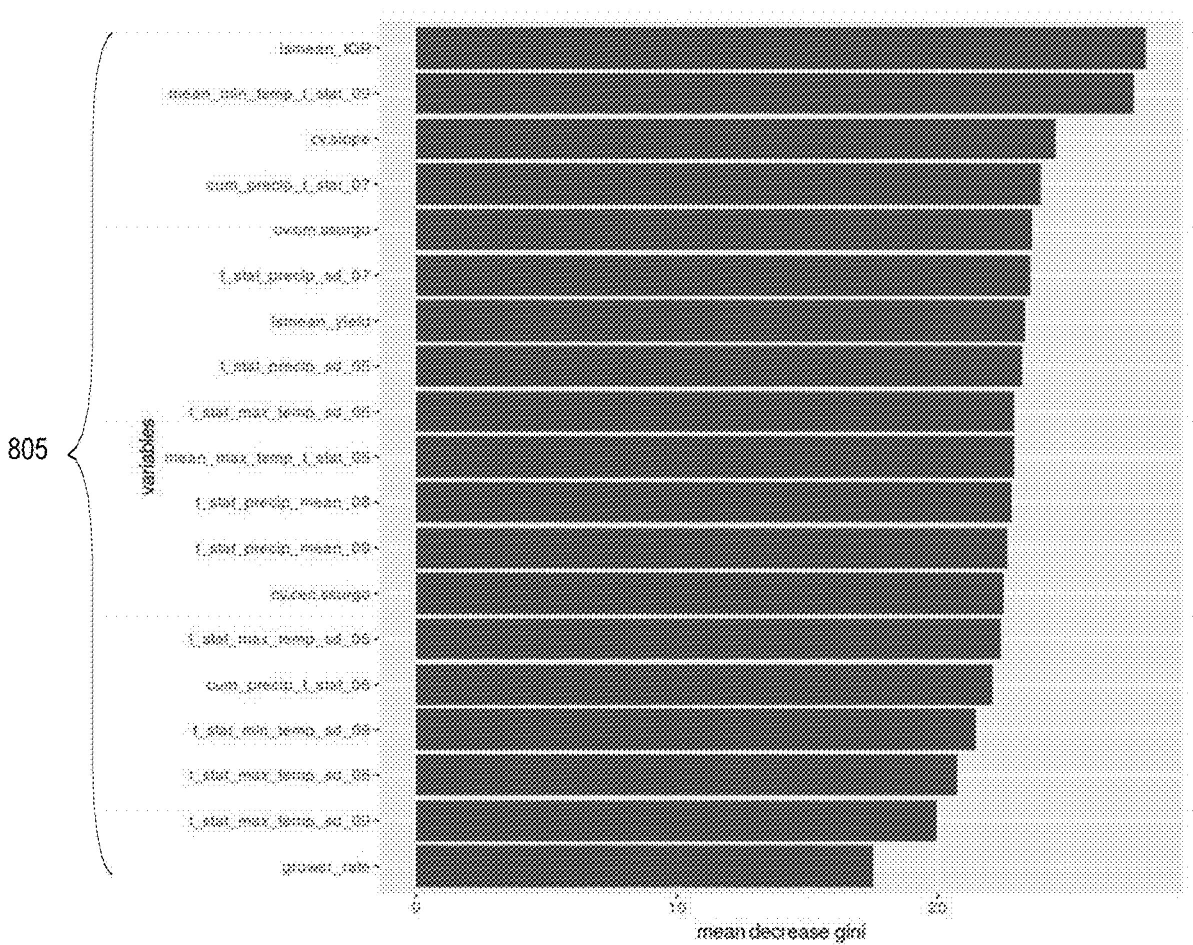
FIG. 8 illustrates an example embodiment of a set of agricultural data features ranked based upon their mean decrease Gini.

FIG. 8 illustrates an example embodiment of a set of agricultural data features ranked based upon their mean decrease Gini. Variables 805 represent the set of agricultural data features for test fields including: mean interquartile crop yield, mean crop yield, grower's seeding rate, soil organic matter, soil CEC, normalized mean minimum temperature for September, normalized minimum standard deviation temperature for September, normalized maximum standard deviation temperature for September, normalized mean maximum temperature for May, normalized maximum standard deviation for May, normalized maximum standard deviation for June, normalized maximum standard deviation for August, normalized cumulative precipitation for June, normalized cumulative precipitation for July, normalized standard deviation of precipitation for May, normalized standard deviation of precipitation for July, normalized mean precipitation for August, normalized mean precipitation for September, and observed degree of slope for fields. The bars for each of the agricultural data features represent their mean decrease Gini.

Figure 9:
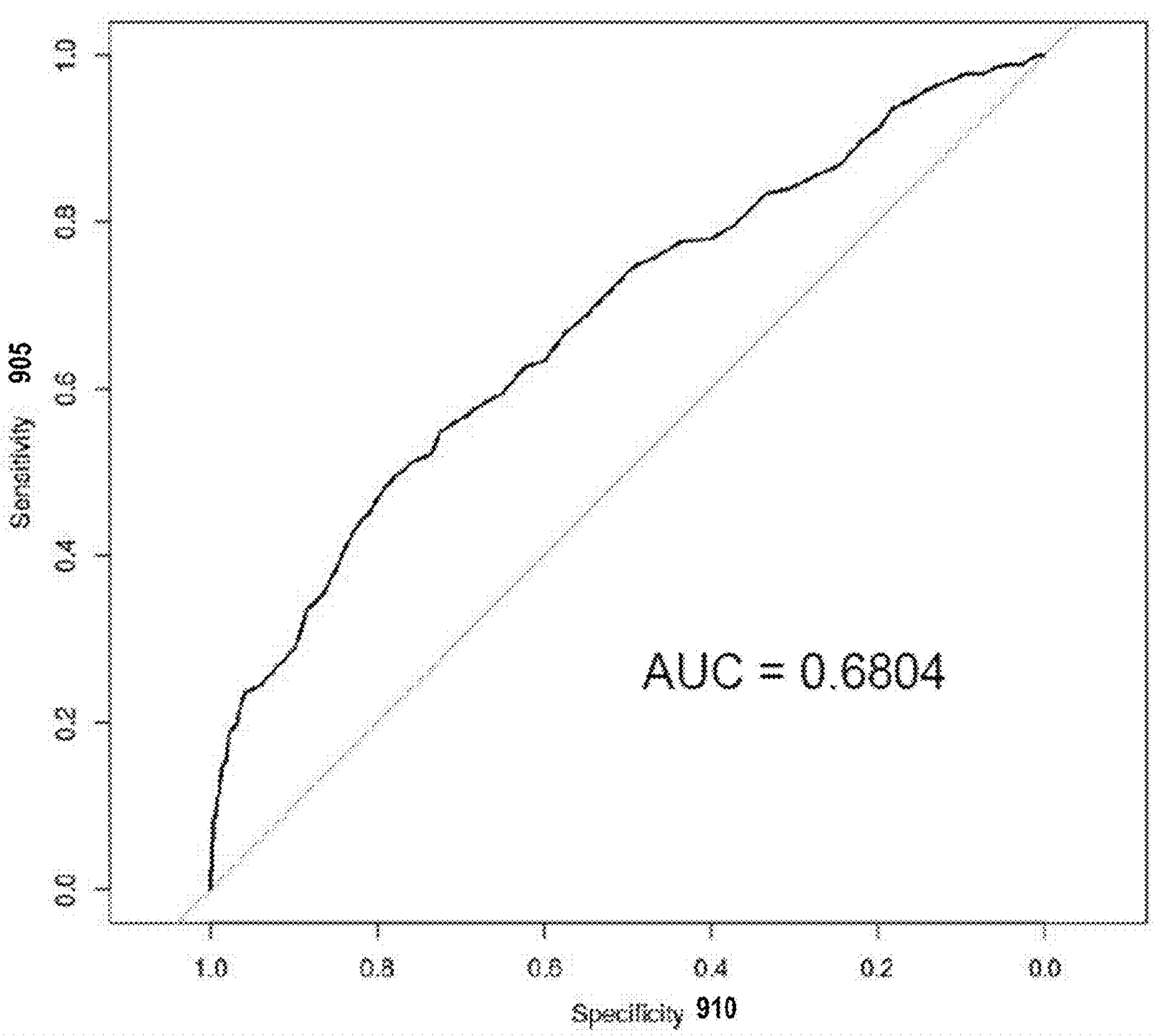
FIG. 9 illustrates an example embodiment of a sensitivity vs. specificity graph of agricultural fields modeled using the selected set of agricultural data features.

FIG. 9 illustrates an example embodiment of a sensitivity vs. specificity graph of agricultural fields modeled using the selected set of agricultural data features. A sensitivity vs. specificity graph may be used to plot a receiver operating characteristic (ROC) curve, which is a graphical plot that illustrates diagnostic ability of a binary classifier system as its discrimination threshold is varied. Results of the graph may be used to identify whether the selected agricultural data features provide an accurate representation of the target sub-fields when compared to one or more training fields. The y-axis represents sensitivity 905 of agricultural features and the x-axis represent a level of specificity 910 for classifying the output. The specificity 910 range goes from 1.0 to 0.0, such that the top right-most points represent the most sensitive level of agricultural features but the least specific in terms of classifying output. ROC curve 915 is created by plotting the true positive rate against the false positive rate at various threshold settings. The area under the curve (AUC) represents the probability that the classifier will rank randomly chosen positive instances higher than randomly chosen negative instances. For example, the AUC for this graph is 0.6804, which means that the model will select randomly chosen positive instances 68.04% of the time over randomly selected negative instances.

In other embodiments, the set of agricultural data features may vary depending on which geographical area of fields were used to gather the training set of historical agricultural data.

3.3. Building Field Variability Model

At block 715, the field variability estimation instructions 174 generates the field variability model, which is configured to determine a level of variability within a field. In an embodiment, the field variability model may be generated using the historical agricultural data corresponding to the set of agricultural data features determined from block 710. The historical agricultural data for the set of agricultural data features may refer to a training set of data gathered from training fields across one or more states and/or countries.

In an embodiment, the field variability estimation instructions 174 may be configured to use a training set of data gathered from training fields that are similar in terms of geography and climate to the input set of agricultural fields for the field variability model. The set of agricultural data features selected from the training fields may be dependent on the field properties and climate associated with the training fields. If the input set of agricultural fields represent fields from a different geographic location than the training fields, then the field variability model may not accurately determine target fields that have a desired level of variability. For example, if the field variability model is trained with data from South America and the input set of agricultural fields are fields in Canada, then the field variability model may not produce accurate estimations.

Figure 10:
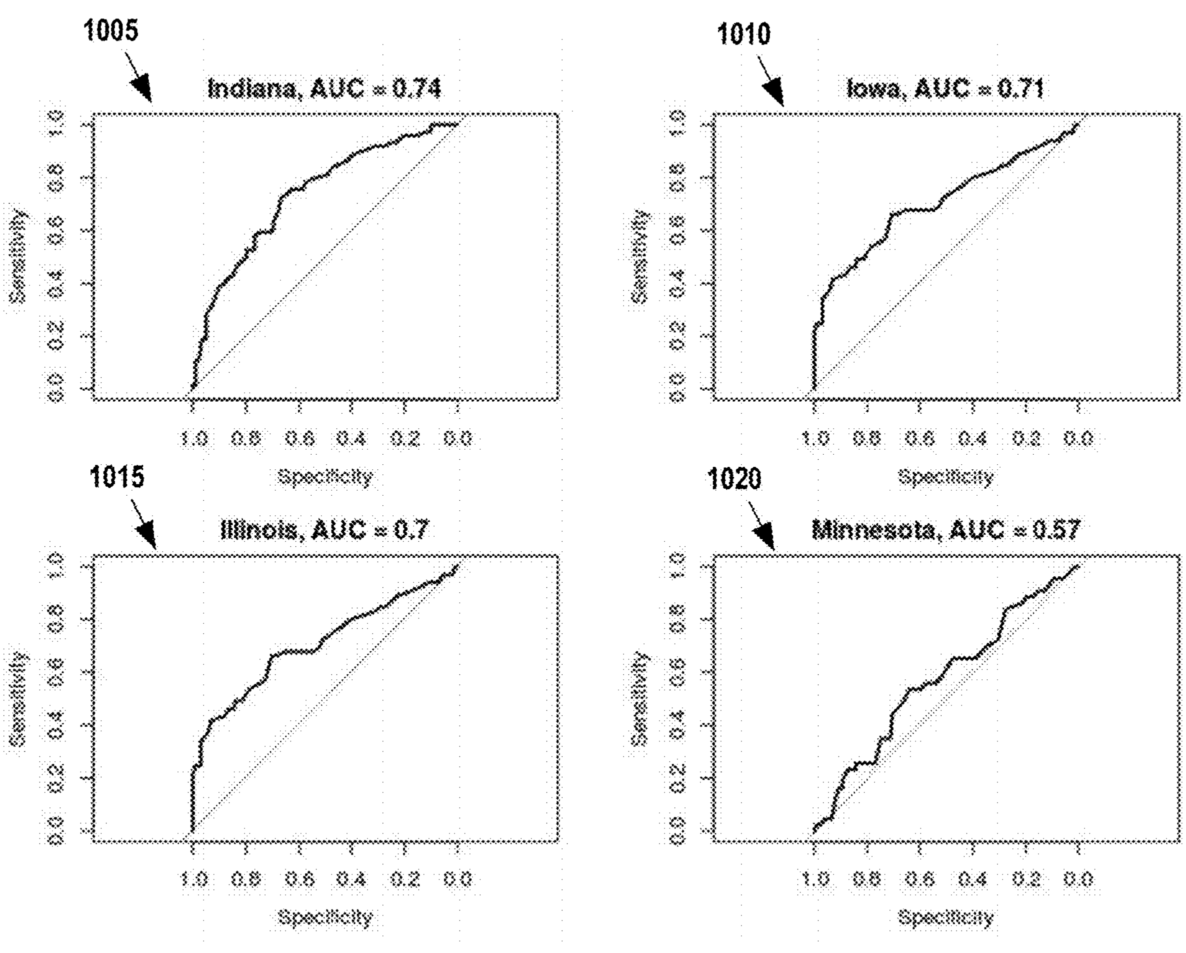
FIG. 10 illustrates example sensitivity vs. specificity graphs for agricultural fields from different States that are modeled using the set of agricultural data features.

FIG. 10 illustrates example sensitivity vs. specificity graphs for agricultural fields from different States that are modeled using the set of agricultural data features. For this example, the training fields used to determine the set of agricultural data features were fields from Indiana and Illinois. Graph 1005 represents a sensitivity/specificity graph for input fields in Indiana. Graph 1010 represents a sensitivity/specificity graph for input fields in Iowa. Graph 1015 represents a sensitivity/specificity graph for input fields in Illinois. Graph 1020 represents a sensitivity/specificity graph for input fields in Minnesota. The AUC values for graphs 1005, 1010, and 1015 are 0.74, 0.71, and 0.7 respectively. The States of Indiana, Illinois, and Iowa each have geographic and weather conditions similar to the training fields from Indiana and Illinois and thus have a high AUC value. Graph 1020, representing fields from Minnesota, has an AUC value of 0.57, which is indicative of the field variability model producing less accurate predictions of fields with variability based upon the set of agricultural data features. For input fields from areas that have different geographic and weather conditions than the training data, the field variability model should be trained using training fields similar to the input fields.

3.4. Determining Field Variability Levels for Fields

Referring to FIG. 7, at block 720 the field variability estimation instructions 174 determine the level of field variability for the plurality of fields using the field variability model. In an embodiment, the field variability estimation instructions 174 may use, as input for the field variability model, the plurality of fields to determine field variability for each of the plurality of fields. The field variability model may assign as output a level of variability that describes a probability that a field has variable crop yield. As described, variable crop yield refers to a field having different levels of crop yield within a particular field. For example, the particular field that has predicted field variability may have a first sub-area that produces 130 bushels/acre, a second sub-area that produces 200 bushels/acre, and a third sub-area that produces 100 bushels/acre. Whereas another field, which is predicted to have static crop yield, may have multiple sub areas that all produce around the same crop yield, such as 150 bushels/acre.

Figure 11:
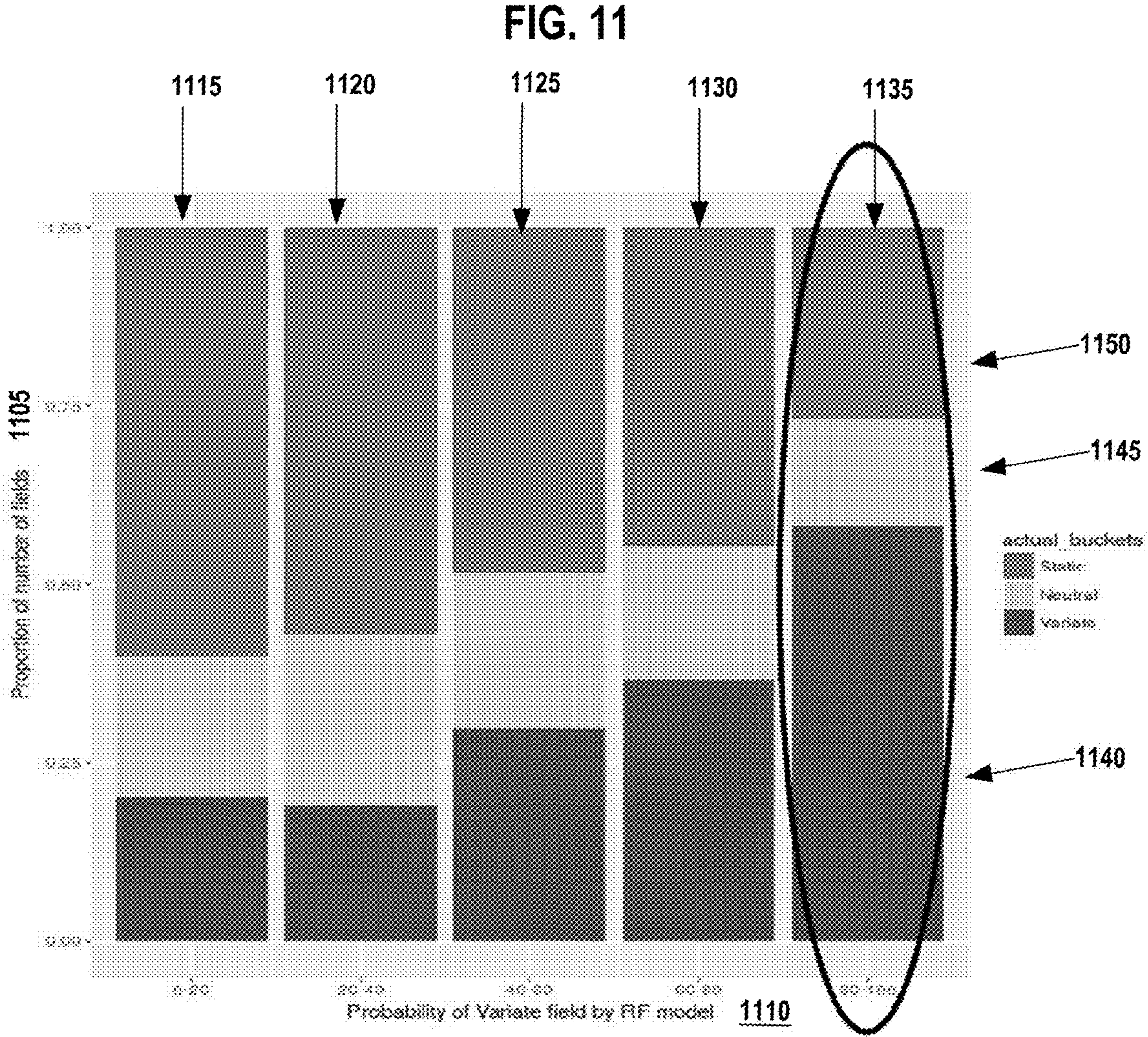
FIG. 11 illustrates grouping agricultural fields together based upon their level of variability.

At block 725, the field variability estimation instructions 174 may rank each of the plurality of fields based on the level of variability. In an embodiment, the field variability estimation instructions 174 may group agricultural fields together based upon the level of field variability. For example, the field variability estimation instructions 174 may group fields together based upon probability values. FIG. 11 illustrates grouping agricultural fields together based upon their level of variability. Y-axis 1105 represents the proportion of number of fields and x-axis 1110 represents the probability of variate fields. The bars each represent a group of fields that have been grouped based on their level of variability. For example, bar 1115 represents a group of fields with 0-20% variability, bar 1120 represents a group of fields with 20-40% variability, bar 1125 represents a group of fields with 40-60% variability, bar 1130 represents a group of fields with 60-80% variability, bar 1135 represents a group of fields with 80-100% variability. Within each bar, the proportion of the fields that represent variable rates, static rates, and neutral (or unclassified) rates are labelled. For example, within bar 1135, portion 1140 represents the number of fields identified as having variable rates. Portion 1145 represents the number of fields identified as having neutral or unclassified rates. Portion 1150 represents the number of fields identified as having static rates.

3.5. Identifying a Set of Target Fields

At block 730, the target field identification instructions 176 may identify a set of target fields from the plurality of fields that have level of variability above a field variability threshold. In an embodiment, the target field identification instructions 176 may use the ranked agricultural fields to determine a subset of fields that represent the set of target fields using the level of variability. The set of target field may be identified using the field variability threshold where the field variability threshold may represent a cutoff level of variability or a cutoff of a percentage of agricultural fields. For example, the target field identification instructions 176 may select the top 20% of fields to represent the set of target fields. In other examples, different percentages may be used such as the top 10% or the top 30% depending on the overall levels of field variability. For instance, if the overall number of agricultural fields have a high level of variability, then the target field identification instructions 176 may select a larger subset of fields as the target fields, such as the top 30% or 40% of fields. By implementing a field variability threshold to determine the set of target fields that have a desired level of inter-field crop yield variability, the target field identification subsystem 170 may be able to minimize the amount of risk to crop yield that may be associated with varying seeding rates in fields that have static crop yield.

4. Functional Overview—Determine Adjusted Seeding Rates

Figure 12:
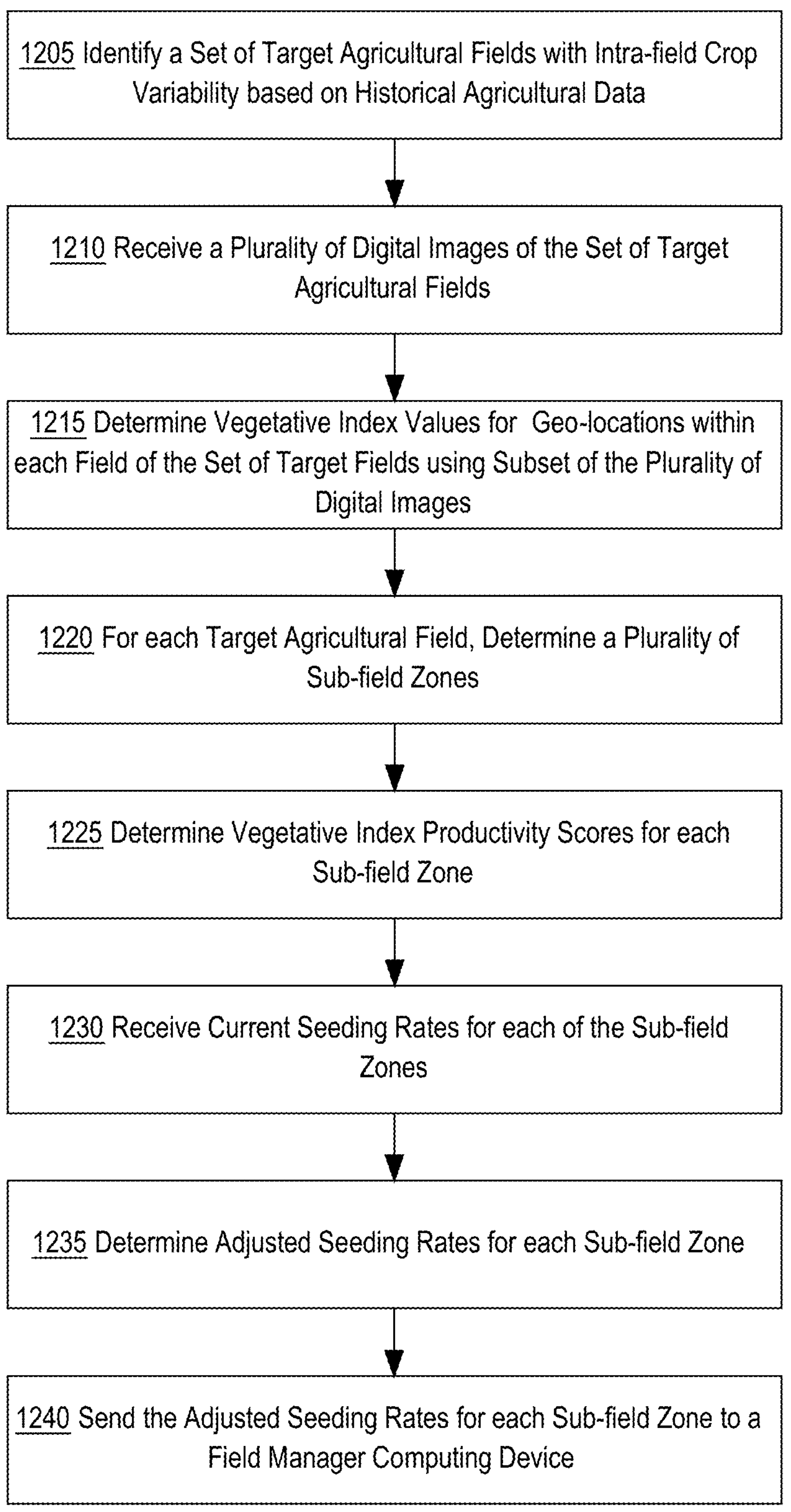
FIG. 12 illustrates a programmed process for determining adjusted seeding rates for sub-field zones of target fields based upon vegetative index values that describe productivity of crop within sub-field zones.

FIG. 12 illustrates an example embodiment for determining adjusted seeding rates for sub-field zones of target fields based upon vegetative index values that describe productivity of crop within sub-field zones. At block 1205, the target field identification subsystem 170 may identify a set of target fields with intra-field crop yield variability based on historical agricultural data collected from various sources. In an embodiment, the target field identification subsystem 170 identifies a set of target fields, from a plurality of fields, that have intra-field crop yield variability using the field variability model described in section 3.

4.1. Collecting Digital Images of Target Fields

At block 1210, system 130 may receive a plurality of digital images of the set of target agricultural fields. In an embodiment, system 130 may receive a plurality of digital images corresponding to each target field of the set of target agricultural fields. For example, remote sensing digital images may be used for crop field prediction before harvest. In some examples, the digital images represent large areas covering a region or a state. In other examples, remote sensing digital images may be captured at a field level resolution where intra-field yield variation may be modeled.

In an embodiment, the plurality of digital images received correspond to observations of the target fields over several years. During that period the target fields may have varied crops, such as rotating between corn and soybean. For example, several digital images representing a target field may observe corn crop even though the recommended seeding rate adjustment is specific to soybean.

In an embodiment, system 130 may be configured to digital image processing techniques to the received digital images in order to reduce or remove noise and other distorting effects, such as clouds and other obstructions.

4.2. Determining Vegetative Index Values

At block 1215, the vegetative index calculation instructions 182 may determine vegetative index values for geo-locations within each field of the set of target fields. In an embodiment, the vegetative index calculation instructions 182 may select a subset of digital images that correspond to a specific target field. The vegetative index calculation instructions 182 may be programmed to convert the digital images into image vectors that correspond to entire images or specific features of the digital images depending on the nature and resolution of the images. Vegetative index values may be calculated for specific geo-locations within a target field. Examples of vegetative indexes may include the Normalized Difference Vegetative Index (NDVI), the Transformed Soil Adjusted Vegetative Index (TSAVI), Enhanced Vegetative Index (EVI), or any other techniques or approaches that process digital images to evaluate different spectral properties in order to determine whether a particular area contains live green vegetation and determine the amount of biomass present.

Figure 13:
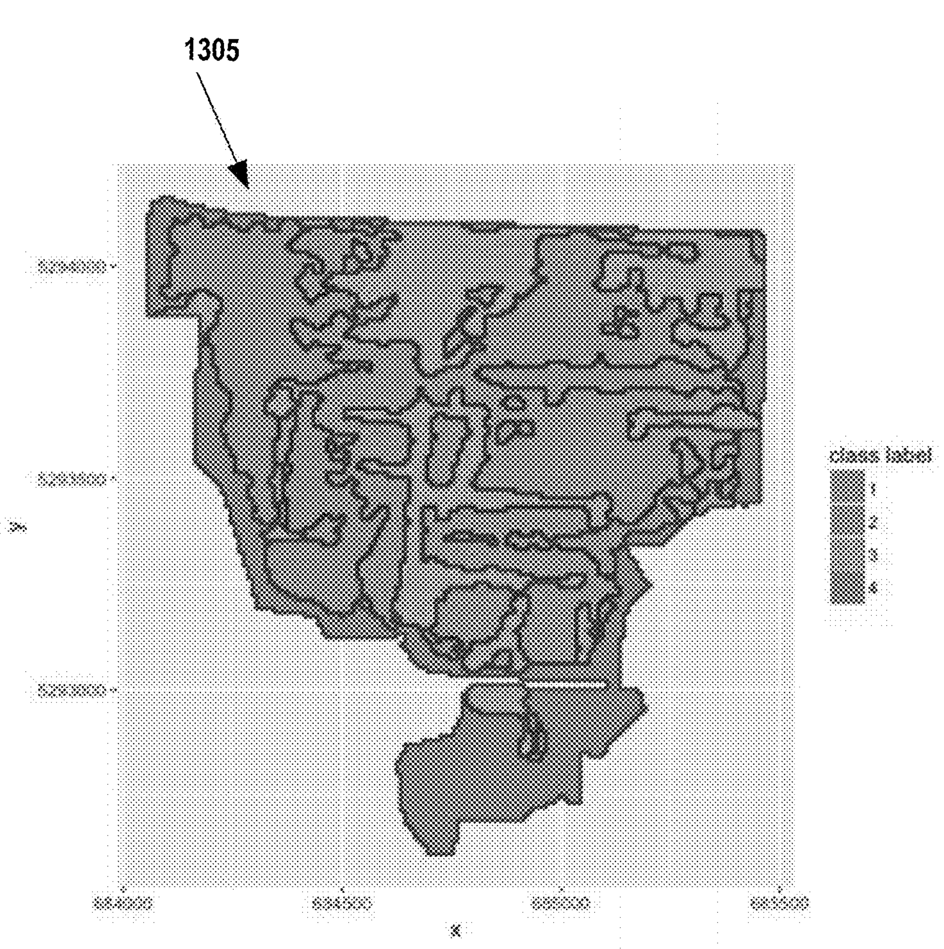
FIG. 13 illustrates an example embodiment, of a transformed digital image indicating estimated vegetative index values corresponding to a particular target field.

In an embodiment, depending upon the resolution of the digital images, vegetative index values may be assigned to pixels of digital images corresponding to a particular geo-location within the target field. FIG. 13 illustrates an example embodiment, of a transformed digital image indicating estimated vegetative index values corresponding to a particular target field. Digital image 1305 represents vegetative index values corresponding to physical locations across the particular target field. For example, each pixel may represent a ten meter by ten meter region. Locations corresponding to each pixel may be identified through latitude and longitude and then translated to pixel location values where each pixel location value represents a number of pixels between the pixel location and both the side edge and bottom edge of the pixel map. Thus, a pixel with a location value of (6:3) may be six pixels from the left side of the pixel map and three pixels from the bottom of the pixel map. In an example where each pixel represents a ten meter by ten meter region, the pixel with a location value of (6:3) may correspond to a physical location that is 50-60 meters from the lowest longitudinal coordinate of the region depicted by the pixel map and 20-30 meters from the lowest latitudinal coordinate.

The intensity of each pixel of digital image 1305 corresponds to a calculated vegetative index value at the location of the pixel. The vegetative intensity for each location corresponding to a pixel may then be converted to a color or shade for the pixel. While FIG. 13 depicts a digital image of a pixel map generated from vegetative index values, pixel maps may also be generated from other values, such as yield values, pH value, moisture content, nutrient content in the soil, temperature, and/or wavelengths of refracted light from digital images. Additionally, pixel maps may be generated from difference values, such as absolute values of differences between measured temperature and a predetermined optimal temperature. Thus, a pixel map may represent deviations from optimal values instead of the range of values.

4.3. Determining Sub-Field Zones Within Fields

At block 1220, the sub-field zone determination instructions 184 may determine a plurality of sub-field zones using the vegetative index values assigned to geo-locations within a particular target field. In an embodiment, the sub-field zone determination instructions 184 may, for each target field within the set of target fields, determine sub-field zones within the target fields. For example, the sub-field zone determination instructions 184 may analyze each of the assigned vegetative index values for geo-locations within a target field and may generate a sub-area containing one or more geo-locations that have similar vegetative index values. Similar vegetative index values may indicate that the one or more geo-locations have similar soil and weather properties that may result is similar crop yields. After determining a plurality of sub-areas, the sub-field zone determination instructions 184 may combine adjacent sub-areas that have similar vegetative index values to generate a sub-zone. One or more sub-zones may then be generated for a target field.

FIG. 14 illustrates an example embodiment of determining sub-field zones within fields and determining a vegetative productivity score for each of the sub-field zones. View 1410 illustrates identified sub-field zones within target field 1405. For example, sub-field zone 1412 may represent a first identified sub-zone containing physical locations that have similar vegetative index values. Sub-field zone 1414 and sub-field zone 1416 each represent additional sub-field zones within target field 1405, each sub-field zone having distinct vegetative index values for target field 1405.

4.4. Determining Vegetative Productivity Scores for Sub-Field Zones

Referring to FIG. 12, at block 1225 the vegetative index calculation instructions 182 may determine vegetative index productivity scores for each sub-field zone of each target field. Vegetative index productivity scores may represent a relative crop productivity for a sub-field zone relative to other zones within the target field. In an embodiment, the vegetative index calculation instructions 182 may calculate a mean vegetative index value for each sub-field zone within each target field. The mean vegetative index value may represent an average value of the calculated vegetative index values for geo-locations within a particular zone. Referring to FIG. 14, view 1420 represents the mean vegetative index values calculated for the identified sub-zones for target field 1405. Sub-field zone 1412 has a calculated mean vegetative index value of 0.5, sub-field zone 1414 has a calculated mean vegetative index value of 0.4, and sub-field zone 1416 has a calculated mean vegetative index value of 0.3.

In an embodiment, in order to calculate vegetative index productivity scores, a mean target field vegetative index value for the entire target field will need to be calculated. The vegetative index calculation instructions 182 may calculate the mean target field vegetative index value for geo-locations within the entire target field. For example, the mean target field vegetative index value for target field 1405 equals 0.4.

The vegetative index productivity score may account for the type of crop planted by factoring in plant growth properties of the crop. For example, corn typically grows with a single tiller and is not negatively affected by high seeding population. Conversely, soybean plants have multiple branches and pods and may be negatively affected if the seeding population is increased too much. Therefore, plant properties may be taken into account when determining vegetative index productivity scores that may then be used to adjust seeding population.

In an embodiment, vegetative index calculation instructions 182 may calculate vegetative index productivity scores for soybean seeds as:

$$\text{Zone productivity Score} = \frac{1}{\frac{(\text{zone mean veg. index}}{\text{target field mean veg. index})}}$$

where the sub-field zone vegetative index productivity score is equal to the inverse of the relative productivity of a sub-field zone. For example, sub-field zone 1412 has a vegetative index value of 0.5 and the target field mean vegetative index value is 0.4. The relative vegetative index value would then equal 0.5/0.4=1.25. The vegetative index productivity score for soybean would equal the inverse of the relative vegetative index value, 1/(1.25)=0.8. Historical observations have shown for soybean that reducing seeding rates in areas where there is a high relative vegetative index values results to increased productivity. Similarly, increasing seeding rates in areas where there is a lower relative vegetative index values results to increased productivity. For this reason, the relative vegetative index value is inverted to produce the vegetative index productivity score for soybean.

In another embodiment, vegetative index calculation instructions 182 may calculate vegetative index productivity scores for corn seeds as:

$$\text{Zone productivity Score} = \frac{1}{(\text{zone mean } veg.\text{ index/target field mean } veg.\text{ index})}$$

where the sub-field zone vegetative index productivity score is equal to the relative productivity of a sub-field zone. Historical observations have shown for corn plants that increasing seeding rates in areas where there is a high relative vegetative index values results to increased productivity.

Referring to FIG. 14, view 1430 illustrates calculated vegetative index productivity scores for sub-field zones 1412, 1414, and 1416. The vegetative index productivity score for sub-field zone 1412 is calculated as 0.8. The vegetative index productivity score for sub-field zone 1414 is calculated as 1.0. The vegetative index productivity score for sub-field zone 1416 is calculated as 1.2.

4.5. Generating Seeding Rate Prescriptions

In an embodiment, adjusted seeding rates may be calculated using the sub-field zone vegetative index productivity scores and the current seeding rates provided by the grower. Referring to FIG. 12, at block 1230 system 130 may receive current seeding rates for each sub-field zones of each target field. If the grower does not vary the seeding rate for the target field, then the seeding rate for the whole field may be used for each zone. For example, referring to view 1440, system 130 may receive seeding rates for target field 1405 as 140 lbs/acre for sub-field zone 1412, 140 lbs/acre for sub-field zone 1412, 140 lbs/acre for sub-field zone 1412.

At block 1235, the seeding rate adjustment instructions 186 may determine the adjusted seeding rates for each of the sub-field zones of each of the target fields by adjusting the current seeding rates using the vegetative index productivity scores corresponding to each sub-field zone. In an embodiment, the seeding rate adjustment instructions 186 may multiply the current seeding rate by the vegetative index productivity scores to calculate the adjusted seeding rate. For example, view 1450 displays the adjusted seeding rates for sub-field zones 1412, 1414, and 1416. Sub-field zone 1412 has an adjusted seeding rate of 110 lbs/acre (140 lbs/acre*0.8). Sub-field zone 1414 has an adjusted seeding rate of 140 lbs/acre (140 lbs/acre*1.0). Sub-field zone 1416 has an adjusted seeding rate of 180 lbs/acre (140 lbs/acre*1.3).

In an embodiment, the seeding rate adjustment instructions 186 may be configured to identify specific sub-field zones where seeding rate adjustment shows a dramatic decrease. Large changes in seeding rate may be caused by environmental factors such as ponding, drought, a soybean iron deficiency chlorosis (IDC), or any other factor. IDC is a nutrient deficiency with general symptoms of chlorosis (yellowing) of the soybean foliage and stunting of the plant. IDC may cause yield-limiting in many target fields. Causal factors such as these may negatively impact crop within a specific sub-field zone such that applying the adjusted seeding rate may not increase productivity because of the environmental factors.

The vegetative index calculation instructions 182 may be configured to further analyze target field observations in order to determine whether extreme environmental factors such as ponding, drought, IDC, or any other factor may be causing yield limitations. If an extreme environmental condition is identified, then the vegetative index calculation instructions 182 may communicate the identified conditions to the seeding rate adjustment instructions 186 which may further adjust seeding rates for sub-field zones. For example, if IDC is identified in sub-field zone 1412 then the seeding rate adjustment instructions 186 may cause further adjustment of the seeding rate and may program farming equipment to apply IDC treatment spray. In another example, if ponding is identified by the vegetative index calculation instructions 182 for sub-field zone 1412, then the seeding rate adjustment instructions 186 may adjust the seeding rate to zero.

4.6. Applying Seeding Rate Prescriptions

Referring to FIG. 12, at block 1240 system 130 may send the adjusted seeding rates for each of the sub-field zones for each of the target fields to the field manager computing device. In an embodiment, system 130 may generate seeding application instructions and may send the seeding application instructions to a planter for application of seeds to the set of target fields. For example, system 130 may send application instructions that specify the adjusted seeding rates for each sub-field zone in each target field to one or more planters that are programmed to automatically apply an amount of seed to areas based on the received seeding rates. The application instructions may represent one or more programming scripts that may be used by agricultural equipment, such as the planter, for planting seeds in each of the sub-field zones in each of the target fields. The one or more programming scripts may specify values for operating parameters, such as specific seeding rates for areas specified by GPS coordinates. Areas may represent the sub-field zones. For example, the application instructions may specify a first seeding rate for a first sub-field zone and a second seeding rate for a second sub-field zone. During planting, the planter may adjust the seeding rates from the first seeding rate to the second seeding rate when the planter detects that it is moving from the first sub-field zone to the second sub-field zone.

Figure 15:
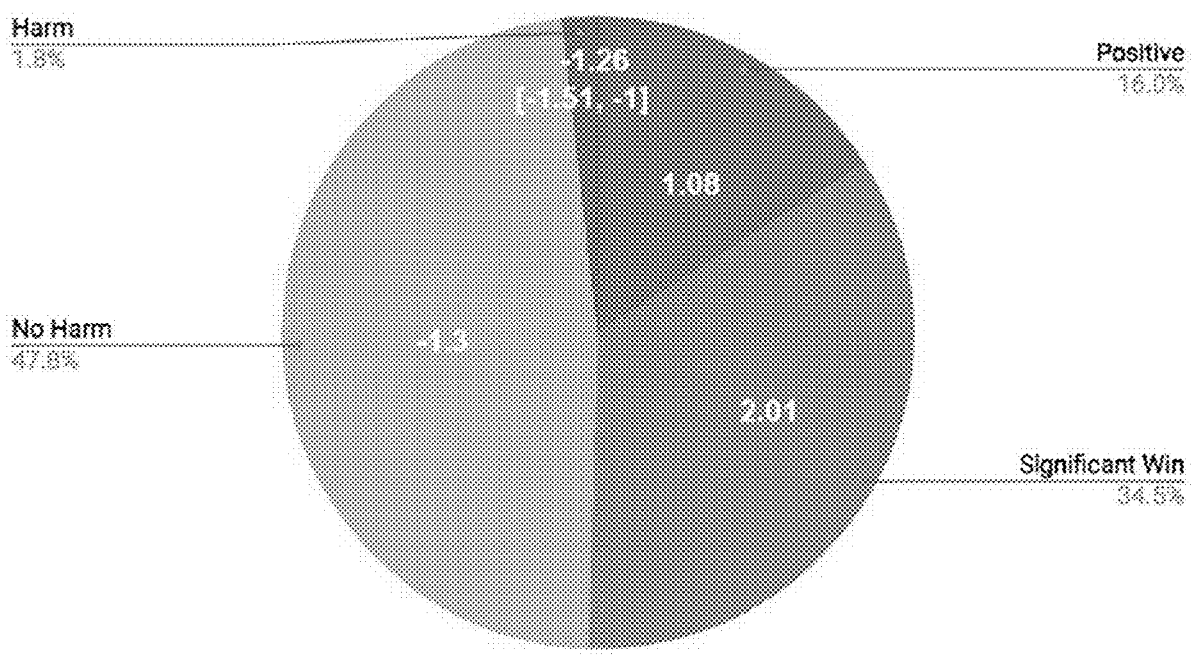
FIG. 15 illustrates observed soybean yield for the set of target fields in response to applying adjusted seeding rates.

In an embodiment, target-field observations may be collected after applying the adjusted seeding rates. The target-field observations may then be used to generate one or more crop yield reports for a grower and/or may be used as training data for future seeding rate adjustment forecasts. For example, the presentation layer 134 in system 130 may generate a target-field result report for the one or more target fields and send the report to the field manager computing device 104 for a grower to view. The report may contain a graphical view of the one or more target-fields, including the one or more sub-field zones. Each of the sub-field zones may include an overlay of the target-field observations. The report may also contain aggregated observations describing the effect of the adjusted rates, such as whether a field experienced a yield gain, a yield loss, or whether there was no effect. FIG. 15 illustrates observed soybean yield for the set of target fields in a pie chart. The pie chart illustrates that 34.5% of the target field produced a 2.01 bushel/acre yield increase when compared to the original seeding rates, 16% of target fields produced a 1.08 bushel/acre yield increase, 47.8% of target fields produced a −1.3 bushel/acre yield decrease, and 1.8% of target fields produced a −1.26 bushel/acre yield decrease. Yield increases of 2 bushels per acre may be considered a significant increase in yield, thus adjusting the seeding rates, as described, produced significant yield increase in 34.5% of target fields.

In an embodiment, the target-field observations may be used as further training data to train the field variability model. For example, the adjusted seeding rates for each sub-field zone may be used as a training data set with the target-field observations representing label data specifying whether the observed outcomes resulted in yield gain, yield loss, or no effect. This training data may be used to in conjunction with the training set of data from training fields to further fine tune the field variability model.

5. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for use in prescribing adjusted seeding rates for agricultural fields, the method comprising:

identifying, using a server computer, a set of target agricultural fields with intra-field crop yield variability above a field variability threshold, the intra-field crop yield variability based upon historical agricultural data comprising historical yield data and historical observed agricultural data for a plurality of fields;

receiving, over a digital data communication network at the server computer, a plurality of digital images of the set of target agricultural fields;

determining, using the server computer, vegetative index values for multiple geo-locations within each field of the set of target agricultural fields using subsets of the plurality of digital images, wherein each subset among the subsets of the plurality of digital images corresponds to a specific target field in the set of target agricultural fields, the vegetative index values indicative of greenness in the multiple geo-locations within each field of the set of target agricultural fields;

for each target field in the set of target agricultural fields:

determining, using the server computer, a plurality of sub-field zones based upon vegetative index values for geo-locations within the target field, wherein each sub-field zone of the plurality of sub-field zones contains similar vegetative index values; and determining, using the server computer, a vegetative index productivity score for each sub-field zone of the target field, based on a ratio between the vegetative index values for geo-locations within the sub-field zone and the vegetative index values for geo-locations within the target field, wherein the vegetative index productivity score represents a crop productivity specific to a type of seed planted within the corresponding sub-field zone relative to the target field;

receiving, over the digital data communication network at the server computer, current seeding rates for each of the sub-field zones of the set of target agricultural fields;

determining, using the server computer, adjusted seeding rates for each of the sub-field zones of the set of target agricultural fields by adjusting the current seeding rates using the vegetative index productivity score corresponding to each of the sub-field zones;

causing planting of seeds in a first sub-field zone of a target field of the set of target agricultural fields, by a planter, at a first one of the adjusted seeding rates; and then detecting movement of said planter from the first sub-field zone to a second sub-field zone of the target field of the set of target agricultural fields; and causing planting of the seeds in the second sub-field zone, by said planter, at a second one of the adjusted seeding rates different than the first one of the adjusted seeding rates.

2. The computer-implemented method of claim 1, wherein identifying the set of target agricultural fields with intra-field crop yield variability comprises:

receiving, over the digital data communication network at the server computer, the historical agricultural data for the plurality of fields;

determining, using the server computer, a set of agricultural data features representing observed field conditions and observed crop yields over a plurality of observation times for the plurality of fields;

generating a field variability model that determines a level of variability for a field using the set of agricultural data features;

determining the level of variability for each of the plurality of fields using the field variability model, wherein input for the field variability model is a specific field and corresponding agricultural data for the specific field;

ranking each of the plurality of fields based on the level of variability determined from the field variability model; and identifying the set of target agricultural fields from the plurality of fields that have levels of variability above the field variability threshold.

3. The computer-implemented method of claim 2, wherein the set of agricultural data features comprises at least one of: an inner quartile range for yield, observed mean monthly temperature, field slope, observed monthly precipitation, observed soil organic matter, observed crop yield, and seeding rate.

4. The computer-implemented method of claim 1, wherein determining the adjusted seeding rates for each of the sub-field zones of the set of target agricultural fields comprises, for each sub-field zone of each of the target agricultural fields, determining the adjusted seeding rate for the sub-field zone by multiplying the current seeding rate of the sub-field zone by the vegetative productivity score of the sub-field zone.

5. The computer-implemented method of claim 1, wherein, for each target field in the set of target agricultural fields, determining the vegetative index productivity score for each sub-field zone of the target field comprises:

generating an average target field vegetative index value for the target field based upon the vegetative index values for the geo-locations within the target field; and for each sub-field zone of the target field:

generating an average sub-field zone vegetative index value for the sub-field zone based upon the vegetative index values for the geo-locations within the sub-field zone;

calculating said ratio based on the average sub-field zone vegetative index value and the average target field vegetative index value by dividing the average sub-field zone vegetative index value by the average target field vegetative index value; and then calculating the vegetative index productivity score for the sub-field zone as an inverse of the ratio.

6. The computer-implemented method of claim 4, wherein determining the adjusted seeding rates further comprises:

identifying a sub-field zone having the adjusted seeding rate that is below a prescribed seeding rate threshold;

identifying a subset of digital images and a subset of historical agricultural data corresponding to said identified sub-field zone;

determining, from the subset of digital images and the subset of historical agricultural data, one or more causal features that account for said identified sub-field zone having the adjusted seeding rate below the prescribed seeding rate threshold; and applying a second adjustment to the adjusted seeding rate of said identified sub-field zone.

7. The method of claim 1, wherein causing planting of the seeds in the first sub-field zone of the target field includes modifying an operating parameter defined in one or more scripts used by said planter to plant the seed in the first sub-field zone of the target field according to the first one of the adjusted seeding rates.

8. A non-transitory computer-readable storage medium storing instructions which, when executed by one or more processors in connection with prescribing adjusted seeding rates for agricultural fields, cause the one or more processors to:

identify a set of target agricultural fields with intra-field crop yield variability above a field variability threshold, the intra-field crop yield variability based upon historical agricultural data comprising historical yield data and historical observed agricultural data for a plurality of fields;

receive, over a digital data communication network, a plurality of digital images of the set of target agricultural fields;

determine vegetative index values for geo-locations within each field of the set of target agricultural fields using subsets of the plurality of digital images, wherein each subset among the subsets of the plurality of digital images corresponds to a specific target field in the set of target agricultural fields;

for each target field in the set of target agricultural fields:

determine a plurality of sub-field zones based upon vegetative index values for geo-locations within the target field, wherein each sub-field zone of the plurality of sub-field zones contains similar vegetative index values; and determine a vegetative index productivity score for each subfield zone of the target field, based on a ratio between the vegetative index values for geo-locations within the sub-field zone and the vegetative index values for geo-locations within the target field, wherein the vegetative index productivity score represents a crop productivity specific to a type of seed planted within the corresponding sub-field zone relative to the target field;

receive, over the digital data communication network, current seeding rates for each of the sub-field zones of the set of target agricultural fields;

determine adjusted seeding rates for each of the sub-field zones of the set of target agricultural fields by adjusting the current seeding rates using the vegetative index productivity score corresponding to each of the sub-field zones; and send the adjusted seeding rates for each of the sub-field zones of each of the target agricultural fields to a field manager computing device.

9. The non-transitory computer-readable storage medium of claim 8, wherein the instructions, when executed by the one or more processors to identify the set of target agricultural fields with intra-field crop yield variability, further cause the one or more processors to:

receive, over the digital data communication network, the historical agricultural data for the plurality of fields;

determine a set of agricultural data features representing observed field conditions and observed crop yields over a plurality of observation times for the plurality of fields;

generate a field variability model that determines a level of variability for a field using the set of agricultural data features;

determine the level of variability for each of the plurality of fields using the field variability model, wherein input for the field variability model is a specific field and corresponding agricultural data for the specific field;

rank each of the plurality of fields based on the level of variability determined from the field variability model; and identify the set of target agricultural fields from the plurality of fields that have levels of variability above the field variability threshold.

10. The non-transitory computer-readable storage medium of claim 9, wherein the set of agricultural data features comprises at least one of: an inner quartile range for yield, observed mean monthly temperature, field slope, observed monthly precipitation, observed soil organic matter, observed crop yield, and seeding rate.

11. The non-transitory computer-readable storage medium of claim 8, wherein the instructions, when executed by the one or more processors to determine the vegetative index productivity score for each sub-field zone of the target field, further cause the one or more processors, for each target field in the set of target agricultural fields, to:

generate an average target field vegetative index value for the target field based upon the vegetative index values for the geo-locations within the target field; and for each sub-field zone of the target field:

generate an average sub-field zone vegetative index value for the sub-field zone based upon the vegetative index values for the geo-locations within the sub-field zone;

calculate said ratio based on the average sub-field zone vegetative index value and the average target field vegetative index value by dividing the average sub-field zone vegetative index value by the average target field vegetative index value; and then calculate the vegetative index productivity score for the sub-field zone as an inverse of the ratio.

12. The non-transitory computer-readable storage medium of claim 8, wherein the instructions, when executed by the one or more processors to determine the adjusted seeding rates for each of the sub-fields of the set of target agricultural fields, further cause the one or more processors to, for each sub-field zone of each of the target agricultural fields, determine the adjusted seeding rate for the sub-field zone by multiplying the current seeding rate of the sub-field zone by the vegetative productivity score of the sub-field zone.

13. The non-transitory computer-readable storage medium of claim 12, wherein the instructions, when executed by the one or more processors to determine the adjusted seeding rates, further cause the one or more processors to:

identify a first sub-field zone having the adjusted seeding rate that is below a prescribed seeding rate threshold;

identify a subset of digital images and a subset of historical agricultural data corresponding to the first sub-field zone;

determine, from the subset of digital images and the subset of historical agricultural data, one or more causal features that account for the first sub-field zone having the adjusted seeding rate below the prescribed seeding rate threshold; and apply a second adjustment to the adjusted seeding rate of the first sub-field zone.

14. The non-transitory computer-readable storage medium of claim 8, wherein the instructions, when executed by the one or more processors, further cause the one or more processors to modify an operating parameter defined in one or more scripts used by a planter to plant seed in one or more of the sub-field zones of one or more of the target agricultural fields according to one or more of the adjusted seeding rates.

15. A system for use in prescribing adjusted seeding rates for agricultural fields, the system comprising:

one or more processors;

one or more non-transitory computer-readable media storing one or more instructions which, when executed using the one or more processors, cause the one or more processors to:

identify a set of target agricultural fields with intra-field crop yield variability above a field variability threshold, the intra-field crop yield variability based upon historical agricultural data comprising historical yield data and historical observed agricultural data for a plurality of fields;

receive, over a digital data communication network, a plurality of digital images of the set of target agricultural fields;

determine vegetative index values for geo-locations within each field of the set of target agricultural fields using subsets of the plurality of digital images, wherein each subset among the subsets of the plurality of digital images corresponds to a specific target field in the set of target agricultural fields;

for each target field in the set of target agricultural fields:

determine a plurality of sub-field zones based upon vegetative index values for geo-locations within the target field, wherein each sub-field zone of the plurality of sub-field zones contains similar vegetative index values; and determine a vegetative index productivity score for each sub-field zone of the target field, based on a ratio between the vegetative index values for geo-locations within the sub-field zone and the vegetative index values for geo-locations within the target field, wherein the vegetative index productivity score represents a crop productivity specific to a type of seed planted within the corresponding sub-field zone relative to the target field;

receive, over the digital data communication network, current seeding rates for each of the sub-field zones of the set of target agricultural fields;

determine adjusted seeding rates for each of the sub-field zones of the set of target agricultural fields by adjusting the current seeding rates using the vegetative index productivity score corresponding to each of the sub-field zones; and send the adjusted seeding rates for each of the sub-field zones of each of the target agricultural fields to a field manager computing device.

16. The system of claim 15, wherein the one or more instructions, when executed by the one or more processors to identify the set of target agricultural fields with intra-field crop yield variability, further cause the one or more processors to:

receive, over the digital data communication network, the historical agricultural data for the plurality of fields;

determine a set of agricultural data features representing observed field conditions and observed crop yields over a plurality of observation times for the plurality of fields;

generate a field variability model that determines a level of variability for a field using the set of agricultural data features;

determine the level of variability for each of the plurality of fields using the field variability model, wherein input for the field variability model is a specific field and corresponding agricultural data for the specific field;

rank each of the plurality of fields based on the level of variability determined from the field variability model; and identify the set of target agricultural fields from the plurality of fields that have levels of variability above the field variability threshold.

17. The system of claim 16, wherein the one or more instructions, when executed by the one or more processors to determine the vegetative index productivity score for each sub-field zone of the target field, further cause the one or more processors, for each target field in the set of target agricultural fields, to:

generate an average target field vegetative index value for the target field based upon the vegetative index values for the geo-locations within the target field; and for each sub-field zone of the target field:

generate an average sub-field zone vegetative index value for the sub-field zone based upon the vegetative index values for the geo-locations within the sub-field zone;

calculate the ratio based on the average sub-field zone vegetative index value and the average target field vegetative index value by dividing the average sub-field zone vegetative index value by the average target field vegetative index value; and then calculate the vegetative index productivity score for the sub-field zone as an inverse of the ratio.

18. The system of claim 15, wherein the one or more instructions, when executed by the one or more processors to determine the adjusted seeding rates for each of the sub-fields of the set of target agricultural fields, further cause the one or more processors to, for each sub-field zone of each of the target agricultural fields, determine the adjusted seeding rate for the sub-field zone by multiplying the current seeding rate of the sub-field zone by the vegetative productivity score of the sub-field zone.

19. The system of claim 15, wherein the one or more instructions, when executed by the one or more processors to determine the adjusted seeding rates, further cause the one or more processors to:

identify a first sub-field zone having the adjusted seeding rate that is below a prescribed seeding rate threshold;

identify a subset of digital images and a subset of historical agricultural data corresponding to the first sub-field zone;

determine, from the subset of digital images and the subset of historical agricultural data, one or more causal features that account for the first sub-field zone having the adjusted seeding rate below the prescribed seeding rate threshold; and apply a second adjustment to the adjusted seeding rate of the first sub-field zone.

20. The system of claim 15, wherein the one or more instructions, when executed by the one or more processors, further cause the one or more processors to modify an operating parameter defined in one or more scripts used by a planter to plant seed in one or more of the sub-field zones of one or more of the target agricultural fields according to one or more of the adjusted seeding rates.

* * * * *